US010500495B2

(12) United States Patent
Gohara

(10) Patent No.: US 10,500,495 B2
(45) Date of Patent: Dec. 10, 2019

(54) NON-TRANSITORY STORAGE MEDIUM HAVING STORED THEREIN SOUND PROCESSING PROGRAM, NON-TRANSITORY STORAGE MEDIUM HAVING STORED THEREIN INFORMATION PROCESSING PROGRAM, SOUND PROCESSING METHOD, SOUND PROCESSING DEVICE, AND NON-TRANSITORY STORAGE MEDIUM HAVING STORED THEREIN GAME PROGRAM

(71) Applicant: NINTENDO CO., LTD., Kyoto (JP)

(72) Inventor: Shigetoshi Gohara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/672,720

(22) Filed: Aug. 9, 2017

(65) Prior Publication Data
US 2018/0043262 A1 Feb. 15, 2018

(30) Foreign Application Priority Data

Aug. 10, 2016 (JP) .................................. 2016-157348

(51) Int. Cl.
*A63F 9/24* (2006.01)
*A63F 13/54* (2014.01)

(52) U.S. Cl.
CPC ...... *A63F 13/54* (2014.09); *A63F 2300/6081* (2013.01)

(58) Field of Classification Search
CPC .......................... A63F 13/54; A63F 2300/6081
See application file for complete search history.

(56) References Cited

U.S. PATENT DOCUMENTS

| 8,189,813 B2 * | 5/2012 | Muraoka ................. A63F 13/10 381/104 |
| 2004/0119889 A1 * | 6/2004 | Ogata ..................... G10L 21/00 348/515 |

(Continued)

FOREIGN PATENT DOCUMENTS

| JP | H11-347250 | 12/1999 |
| JP | 2000-306115 | 11/2000 |

(Continued)

OTHER PUBLICATIONS

Notice of Reasons for Refusal dated Aug. 6, 2019 in Japanese Patent Application No. 2016-157348 and English-language translation.

(Continued)

*Primary Examiner* — Dmitry Suhol
*Assistant Examiner* — Carl V Larsen
(74) *Attorney, Agent, or Firm* — Nixon & Vanderhye, P.C.

(57) ABSTRACT

A CPU performs a sound acquisition step of acquiring sound data for outputting sound, a movement step of moving a virtual sound source and/or a virtual microphone in a virtual space in which the virtual sound source and the virtual microphone are set, a sound modification step of generating modified sound by adding the Doppler effect virtually observed by the virtual microphone when the sound is output from the virtual sound source to the sound of the sound data by calculation using the values of the limited speeds of the virtual sound source and/or the virtual microphone, and a modified sound output step of outputting the modified sound.

6 Claims, 12 Drawing Sheets

(56) References Cited

U.S. PATENT DOCUMENTS

| | | | | |
|---|---|---|---|---|
| 2007/0111768 | A1* | 5/2007 | Tipping | A63F 13/10 463/6 |
| 2013/0120569 | A1* | 5/2013 | Mizuta | A63F 13/54 348/143 |
| 2013/0123962 | A1 | 5/2013 | Mizuta | |
| 2014/0119580 | A1* | 5/2014 | Osada | H04S 7/303 381/300 |
| 2017/0366896 | A1* | 12/2017 | Adsumilli | H04R 1/406 |

FOREIGN PATENT DOCUMENTS

| | | |
|---|---|---|
| JP | 2004-151229 | 5/2004 |
| JP | 2008-194208 | 8/2008 |
| JP | 2013-102843 | 5/2013 |

OTHER PUBLICATIONS

English-language machine translation of JPH11-347250.
English-language machine translation of JP2000-306115.

* cited by examiner

NON-TRANSITORY STORAGE MEDIUM HAVING STORED THEREIN SOUND PROCESSING PROGRAM, NON-TRANSITORY STORAGE MEDIUM HAVING STORED THEREIN INFORMATION PROCESSING PROGRAM, SOUND PROCESSING METHOD, SOUND PROCESSING DEVICE, AND NON-TRANSITORY STORAGE MEDIUM HAVING STORED THEREIN GAME PROGRAM

CROSS REFERENCE TO RELATED APPLICATION

This nonprovisional application is based on Japanese Patent Application No. 2016-157348 filed with the Japan Patent Office on Aug. 10, 2016, the entire contents of which are hereby incorporated by reference.

FIELD

The present disclosure relates to a non-transitory storage medium having stored therein a sound processing program for providing a virtual space and outputting sound and information in the virtual space, a non-transitory storage medium having stored therein an information processing program, a sound processing method, a sound processing device, and a non-transitory storage medium having stored therein a game program.

BACKGROUND AND SUMMARY

There has been known a game in which an object virtually producing sound and a player object operating in response to a user operation are set in a virtual space, wherein when the player object crosses the sound-producing object, the sound is output with the Doppler effect virtually observed by the player object (JP 2008-194208 A, for example).

In the conventional game, however, the Doppler effect is only added in a pseudo manner on the basis of a distance between the attack object as virtual sound source and the player object at a listening position, and thus a different effect from the reality may be caused and an impossible situation can occur.

On the other hand, when calculations are made according to the laws of physics, a moving speed of an object may be incredibly high in a game, and in this case, the Doppler effect is caused as high as it is not actually experienced and an uncomfortable feeling is caused, and the extreme Doppler effect may not be perceived. Thus, an intended dramatic effect may not be sufficiently achieved.

An object of the present disclosure is to enable a user to easily perceive an effect based on a relative speed between a virtual output source and a virtual observation point (such as the Doppler effect based on a relative speed between a virtual sound source and a virtual microphone).

A non-transitory storage medium having stored therein a sound processing program according to one aspect causes a computer to perform a sound acquisition step of acquiring sound data for outputting sound, a setting step of setting a virtual sound source for virtually producing sound and a virtual microphone for virtually capturing the sound virtually produced from the virtual sound source in a virtual space, a movement step of moving the virtual sound source and/or the virtual microphone in the virtual space, a sound modification step of generating modified sound by adding the Doppler effect virtually observed by the virtual microphone when the sound is virtually produced from the virtual sound source to the sound of the sound data by calculation using the values of the limited speeds of the virtual sound source and/or the virtual microphone, and a modified sound output step of outputting the modified sound.

With the configuration, the Doppler effect can be added by use of the values of the limited speeds of the virtual sound source and/or the virtual microphone, and thus it is possible to alleviate a problem that a user cannot perceive the Doppler effect since the speed of the virtual sound source and/or the speed of the virtual microphone is too high.

In the non-transitory storage medium, a position of the virtual sound source in the virtual space may be associated with a position of a first object in the virtual space, and a position of the virtual microphone in the virtual space may be associated with a position of a second object in the virtual space.

With the configuration, it is possible to obtain an acoustic effect when the sound produced from the first object is virtually captured by the second object.

In the non-transitory storage medium, the second object may be a player object moving in the virtual space in response to a user operation.

With the configuration, it is possible to obtain the Doppler effect when the second object moves (have a speed) in response to a user operation.

In the non-transitory storage medium, when a relative speed between the virtual sound source and the virtual microphone exceeds a predetermined upper limit, the values of the limited speeds of the virtual sound source and/or the virtual microphone is a speed by which the relative speed may be limited to the upper limit.

In the non-transitory storage medium, when the speed of the virtual sound source exceeds an upper limit, the values of the limited speeds of the virtual sound source may be the upper limit.

In the non-transitory storage medium, when the speed of the virtual microphone exceeds a predetermined upper limit, the values of the limited speeds of the virtual microphone may be the upper limit.

In the non-transitory storage medium, when the speed of the virtual sound source exceeds a first upper limit, the values of the limited speeds of the virtual sound source may be the first upper limit, and when the speed of the virtual microphone exceeds a second upper limit, the values of the limited speeds of the virtual microphone may be the second upper limit.

A non-transitory storage medium having stored therein an information processing program according to one aspect causes a computer to perform a sound acquisition step of acquiring data for outputting information, a setting step of setting a virtual output source for virtually outputting information and a virtual observation point for virtually observing the information virtually output from the virtual output source in a virtual space, a movement step of moving the virtual output source and/or the virtual observation point in the virtual space, an information modification step of generating modified information by adding an effect using the values virtually observed at the virtual observation point when the informant is virtually output from the virtual output source to the information by calculation using the values of the limited speeds of the virtual output source and/or the virtual observation point, and a modified information output step of outputting the modified information.

With the configuration, a relative speed effect can be added to information by use of the values of the limited speeds of the virtual output source and/or the virtual observation point, and thus it is possible to alleviate a problem that a user cannot perceive the relative speed effect since the speed of the virtual output source and/or the speed of the virtual observation point is too high.

A sound processing method according to one aspect includes a sound acquisition step of acquiring sound data for outputting sound, a setting step of setting a virtual sound source for virtually producing sound and a virtual microphone for virtually capturing the sound virtually produced from the virtual sound source in a virtual space, a movement step of moving the virtual sound source and/or the virtual microphone in the virtual space, a sound modification step of generating modified sound by adding the Doppler effect virtually observed by the virtual microphone when the sound is virtually produced from the virtual sound source to the sound of the sound data by calculation using the values of the limited speeds of the virtual sound source and/or the virtual microphone, and a modified sound output step of outputting the modified sound.

Also with the configuration, the Doppler effect can be added by use of the values of the limited speeds of the virtual sound source and/or the virtual microphone, and thus it is possible to alleviate a problem that a user cannot perceive the Doppler effect since the speed of the virtual sound source and/or the speed of the virtual microphone is too high.

A sound processing device according to one aspect includes a controller for inputting a user operation, a storage unit for storing therein sound data for outputting sound, a setting unit for setting a virtual sound source for virtually producing sound and a virtual microphone for virtually capturing the sound virtually produced from the virtual sound source, a movement processing unit for moving at least the virtual microphone in the virtual space on the basis of an operation input in the controller, a sound modification unit for generating modified sound by adding the Doppler effect virtually observed by the virtual microphone when the sound is virtually produced from the virtual sound source to the sound of the sound data by calculation using the values of the limited speeds of the virtual sound source and/or the virtual microphone, and a speaker for outputting the modified sound.

Also with the configuration, the Doppler effect can be added by use of the values of the limited speeds of the virtual sound source and/or the virtual microphone, and thus it is possible to alleviate a problem that a user cannot perceive the Doppler effect since the speed of the virtual sound and/or the speed of the virtual microphone is too high.

A non-transitory storage medium having stored therein a game program according to one aspect causes a computer connected to a controller for inputting a user operation, a storage unit for storing therein sound data for outputting sound, and a speaker for outputting sound to perform a setting step of setting at least a first object and a second object in a virtual space, a movement instruction reception step of receiving an instruction to move the second object in the virtual space from the controller, a reading step of reading the sound data associated with the first object within a predetermined distance from the second object in the virtual space from the storage unit, a sound acquisition step of acquiring sound data for outputting sound, a movement step of moving the second object in response to the instruction to move, a sound modification step of generating modified sound by adding the Doppler effect virtually observed in the second object when the sound is virtually produced from the first object to the sound of the read sound data by calculation using the values of the limited speeds of the first object and/or the second object, and a modified sound output step of outputting the modified sound from the speaker.

Also with the configuration, the Doppler effect can be added by use of the values of the limited speeds of the virtual sound source and/or the virtual microphone, and thus it is possible to alleviate a problem that a user cannot perceive the Doppler effect since the speed of the virtual sound source and/or the speed of the virtual microphone is too high.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

An embodiment will be described below with reference to the accompanying drawings. The embodiment described below is merely exemplary for embodying the present technique, and the present technique is not limited to the specific configurations described below. A specific configuration for the embodiment may be employed as needed for embodying the present technique.

A game processing device, a game system, and a game program according to the present embodiment will be described below. According to the present embodiment, a game system 1 includes a main body device (game processing device) 2, a left controller 4, and a right controller 6. In other form, the game system 1 may include a cradle in addition to the above components. In the game system 1 according to the present embodiment, the left controller 4 and the right controller 6 are detachable from the main body device 2, the main body device 2 is mounted with the left controller 4 and the right controller 6 to be used as an integrated device (see FIG. 1), and the main body device 2 can be used separate from the left controller 4 and the right controller 6 (see FIG. 2). The game system 1 can be used in a form in which an image is displayed on the main body device 2 and can be used in a form in which an image is displayed in other display device such as TV. In the former form, the game system 1 can be used as portable device (such as portable game machine). In the latter form, the game system 1 can be used as stationary device (such as stationary game machine).

Figure 1:
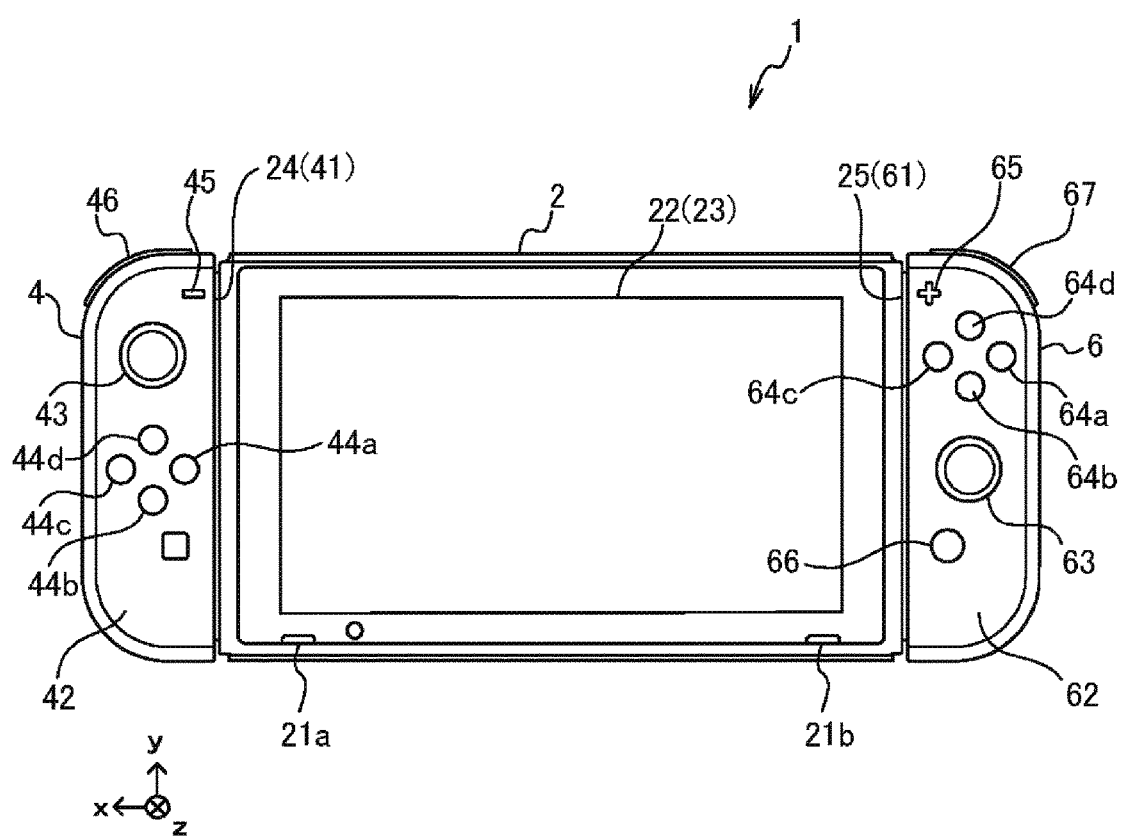
FIG. 1 is a diagram illustrating a state in which a main body device is mounted with a left controller and a right controller in an exemplary game system according to an embodiment.

FIG. 1 is a diagram illustrating a state in which the main body device 2 is mounted with the left controller 4 and the right controller 6 in the game system 1 according to the present embodiment by way of example. As illustrated in FIG. 1, the game system 1 includes the main body device 2, the left controller 4, and the right controller 6. The left controller 4 and the right controller 6 are mounted on the main body device 2 to be integrated. The main body device 2 is directed for performing various kinds of processing in the game system 1. The main body device 2 includes a display 22. The left controller 4 and the right controller 6 each include an operation unit for user's entry.

Figure 2:
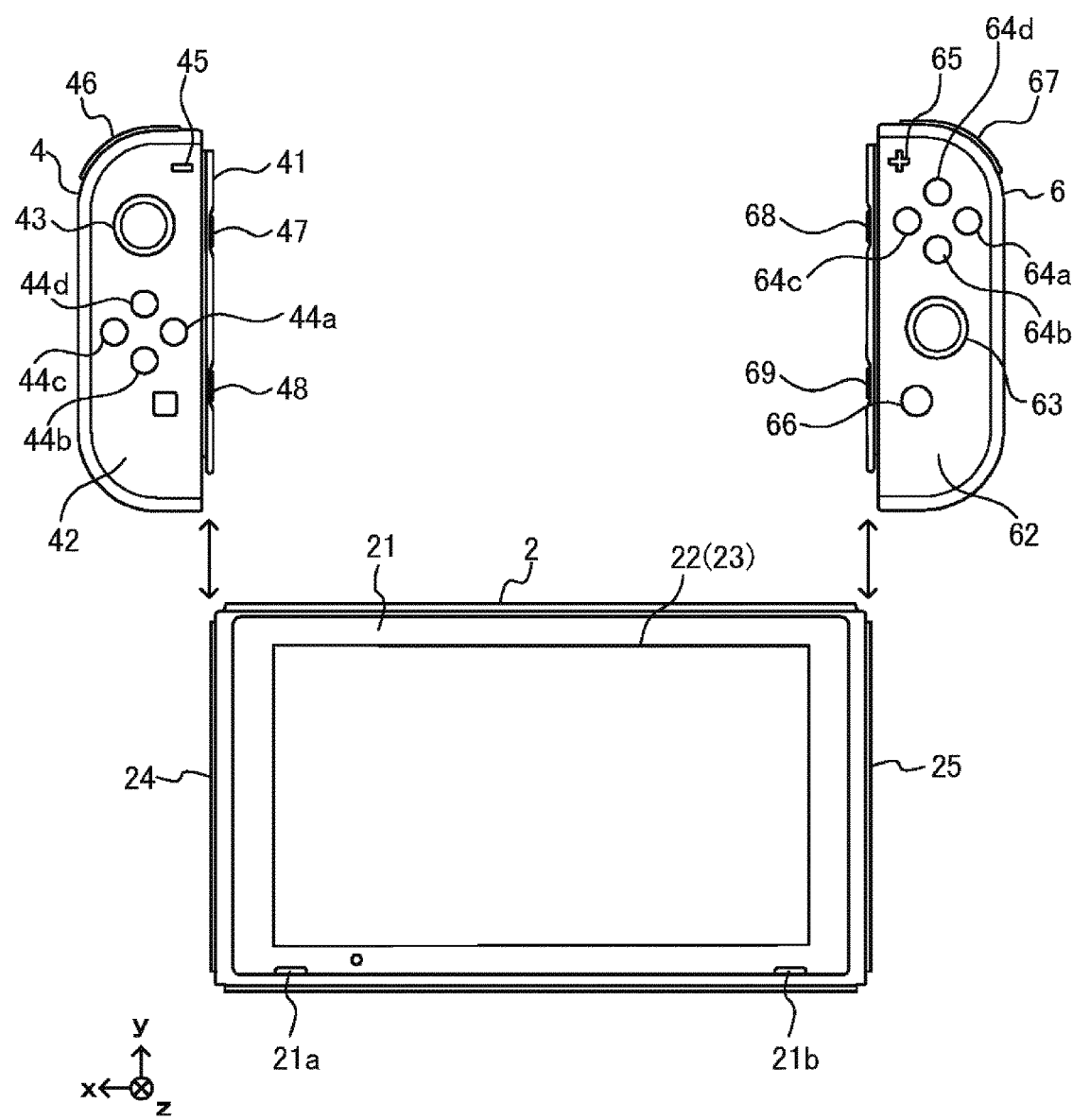
FIG. 2 is a diagram illustrating an exemplary state in which the left controller and the right controller are removed from the main body device according to the embodiment.

FIG. 2 is a diagram illustrating an exemplary state in which the left controller 4 and the right controller 6 are removed from the main body device 2. As illustrated in FIG. 1 and FIG. 2, the left controller 4 and the right controller 6 are detachable from the main body device 2. The left controller 4 can be mounted on the left side of the main body device 2 (on the side in the positive x-axis direction in FIG. 1), and is slid in the y-axis direction in FIG. 1 along the left side of the main body device 2 to be detachable from the main body device 2. Further, the right controller 6 can be mounted on the right side of the main body device 2 (the side in the negative x-axis direction in FIG. 1) and is slid in the y-axis direction in FIG. 1 along the right side of the main body device 2 to be detachable from the main body device 2.

Figure 3:
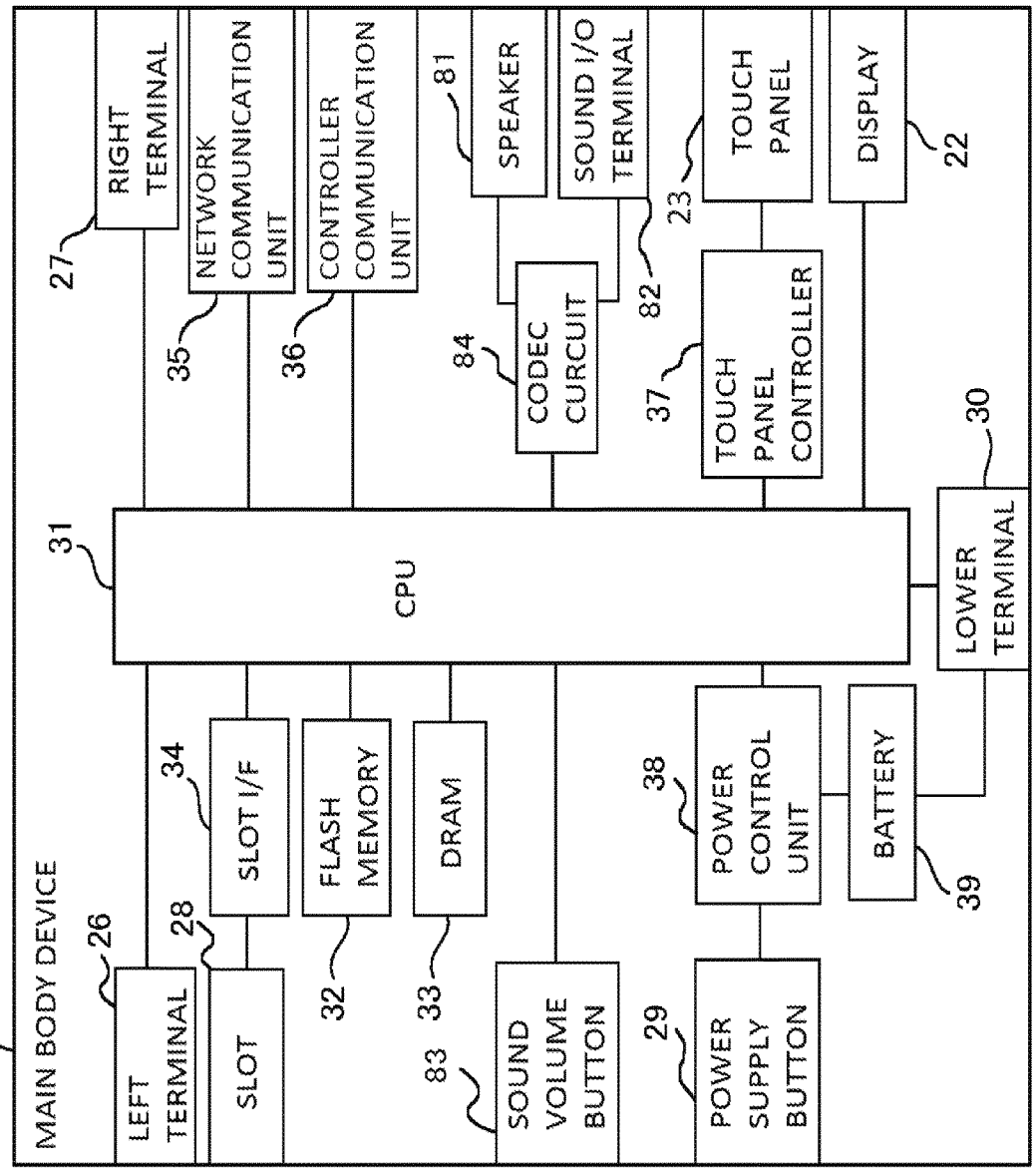
FIG. 3 is a block diagram illustrating exemplary main components in the main body device according to the embodiment.
Figure 4:
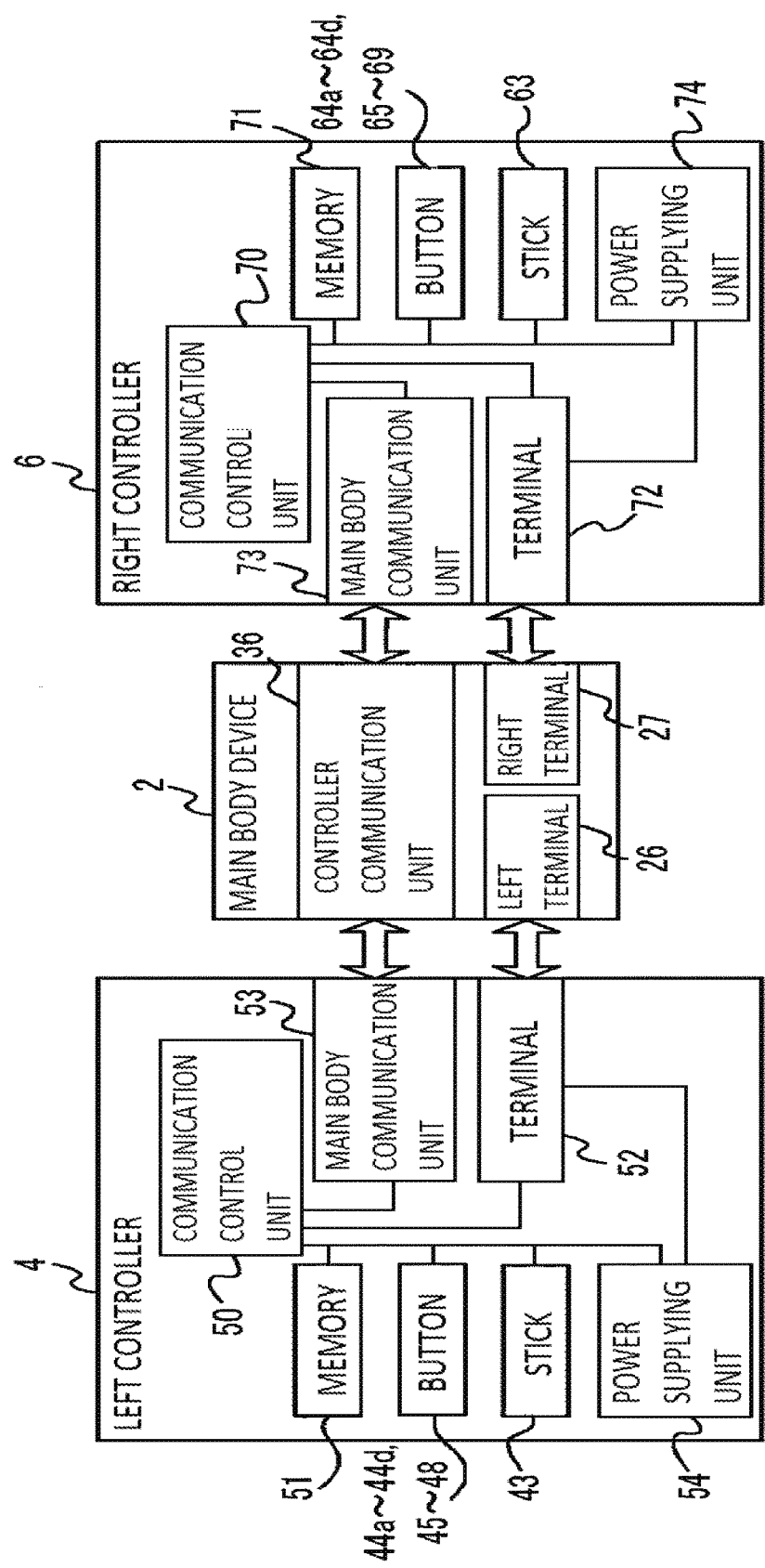
FIG. 4 is a block diagram illustrating exemplary main components in the game system according to the embodiment.

FIG. 3 is a block diagram illustrating exemplary main components in the main body device 2. Some components in the main body device 2 may be mounted as electronic parts on an electronic circuit board to be housed in a housing 11. FIG. 4 is a block diagram illustrating exemplary main components in the game system 1. An internal configuration of the main body device 2 in the game system 1 is illustrated in FIG. 3 in detail and thus is omitted from FIG. 4. An external appearance and internal configuration of the game system 1 will be described below with reference to FIGS. 1 to 4.

[External Appearance of Game System 1]
(Main Body Device 2)

An appearance configuration of the game system 1 will be first described mainly with reference to FIGS. 1 and 2. The main body device 2 includes a housing 21 in a substantially plate shape. According to the present embodiment, the main surface of the housing 21 (in other words, the top surface or the surface on which the display 22 is provided) substantially has a rectangular shape. According to the present embodiment, the housing 21 is assumed to have a laterally-long shape. That is, according to the present embodiment, the long-side direction (or the x-axis direction in FIG. 1) of the main surface of the housing 21 is called lateral direction (horizontal direction), the short-side direction of the main surface (or the y-axis direction in FIG. 1) is called longitudinal direction (also called vertical direction), and the direction orthogonal to the main surface (or the z-axis direction in FIG. 1) is called depth direction (front-back direction). The main body device 2 can be used in a direction in which the main body device 2 is laterally long. The main body device 2 can be used in a longitudinally-long direction. In this case, the housing 21 may be assumed to have a longitudinally-long shape.

Any shape and size of the housing 21 may be employed. By way of example, the housing 21 may have a portable size. The main body device 2 itself, or an integrated device in which the main body device 2 is mounted with the left controller 4 and the right controller 6 may be a portable device. The main body device 2 or the integrated device may be a handy device. The main body device 2 or the integrated device may be a transportable device.

The main body device 2 includes the display 22 provided on the main surface of the housing 21. The display 22 displays an image (which may be a still image or animation) acquired or generated by the main body device 2. According to the present embodiment, the display 22 is assumed as a liquid crystal display device (LCD). The display 22 may be any king of display device. Further, the main body device 2 includes a touch panel 23 on the screen of the display 22. According to the present embodiment, the touch panel 23 is in a multi-touch input system (such as electrostatic capacitance system). The touch panel 23 may be of any kind, and may be a single-touch input system (such as resistive system), for example.

The main body device 2 includes a speaker inside the housing 21. Speaker holes 21a and 21b are formed on the main surface of the housing 21. Output sound of the speaker is output from the speaker holes 21a and 21b, respectively.

The main body device 2 includes a left rail member 24 on the left side of the housing 21. The left rail member 24 is directed for detachably mounting the left controller 4 on the main body device 2. The left rail member 24 is provided to vertically extend on the left side of the housing 21. The left rail member 24 has an engageable shape with a slider 41 of the left controller 4, and a slide mechanism is formed of the left rail member 24 and the slider 41. The slide mechanism enables the left controller 4 to be slidably and detachably mounted on the main body device 2.

The main body device 2 further includes a left terminal 26 (see FIG. 3). The left terminal 26 is directed for making wired communication between the main body device 2 and the left controller 4. When the left controller 4 is mounted on the main body device 2, the left terminal 26 is provided to contact with a terminal 52 of the left controller 4. The left terminal 26 may be at any specific position. According to the present embodiment, the left terminal 26 is provided on the bottom of the left rail member 24. According to the present embodiment, the left terminal 26 is provided near the lower end of the bottom of the left rail member 24.

Similar components to the components provided on the left side are provided on the right side of the housing 21. That is, the main body device 2 includes a right rail member 25 on the right side of the housing 21. The right rail member 25 is provided to vertically extend on the right side of the housing 21. The right rail member 25 has an engageable shape with a slider 61 of the right controller 6, and a slide mechanism is formed of the right rail member 25 and the slider 61. The slide mechanism enables the right controller 6 to slidably and detachably mount on the main body device 2.

The main body device 2 includes a right terminal 27 (see FIG. 3). The right terminal 27 is directed for making wired communication between the main body device 2 and the right controller 6. When the right controller 6 is mounted on the main body device 2, the right terminal 27 is provided to contract with a terminal 72 of the right controller 6. The right terminal 27 may be at any specific position. According to the present embodiment, the right terminal 27 is provided on the bottom of the right rail member 25. According to the present embodiment, the right terminal 27 is provided near the lower end of the bottom of the right rail member 25.

The main body device 2 includes a slot 28 (see FIG. 3). The slot 28 is provided on the upper surface of the housing 21. The slot 28 has a shape capable of mounting a storage medium therein. The storage medium is a dedicated storage medium (such as dedicated memory card) to the game system 1 and the game processing device of the same type. The storage medium is used to store data (such as application save data) used in the main body device 2 and/or programs (such as application programs) executed by the main body device 2. The main body device 2 further includes a power supply button 29 (see FIG. 3). The power supply button 29 is provided on the top surface of the housing 21. The power supply button 29 is directed for switching on/off the power supply of the main body device 2.

The main body device 2 includes a lower terminal 30 (see FIG. 3). The lower terminal 30 is directed for making communication between the main body device 2 and the cradle 8 (see FIG. 9) described below. The lower terminal 30 is provided on the lower surface of the housing 21. When the main body device 2 is mounted on the cradle 8, the lower terminal 30 is connected to a terminal (not illustrated) of the cradle 8. According to the present embodiment, the lower terminal 30 is a USB connector (more specifically, female connector).

The main body device 2 includes a sound I/O terminal (specifically, earphone jack) 82 (see FIG. 3). That is, the main body device 2 can mount a microphone or earphone on the sound I/O terminal 82. The sound I/O terminal 82 is provided on the upper surface of the housing 21.

The main body device 2 includes a sound volume button 83 (see FIG. 3). The sound volume button 83 is provided on the upper surface of the housing 21. The sound volume button 83 is directed for instructing to adjust the sound volume output by the main body device 2. That is, the sound volume button 83 is configured of a button for instructing to turn down the sound volume and a button for instructing to turn up the sound volume.

Any shapes, numbers and installation positions of the aforementioned components (specifically buttons, slots, and terminals) may be provided on the housing 21. For example, according to other embodiment, the power supply button 29 and the slot 28 may be provided on other side or backside of the housing 21. Further, according to other embodiment, the main body device 2 may not include any of the components.

(Left Controller 4)

The left controller 4 includes a housing 42. According to the present embodiment, the housing 42 has a substantially plate shape. The main surface of the housing 42 (in other words, the top surfaces or the surface in the negative z-axis direction in FIG. 1) substantially has a rectangular shape. According to the present embodiment, the housing 42 has a longitudinally-long shape, or a vertically-long shape (or in the y-axis direction in FIG. 1). The left controller 4 can be gripped in a longitudinally-long direction while being removed from the main body device 2. When being gripped in the longitudinally-long direction, the housing 42 has a shape and size capable of being gripped in one hand, particularly with the left hand. The left controller 4 can be gripped in the laterally-long direction. When being gripped in the laterally-long direction, the left controller 4 may be gripped in both hands. The housing 42 has any shape, and the housing 42 may not have a substantially plate shape according to other embodiment. The housing 42 may not have a rectangular shape and may have a semicircular shape or the like, for example. The housing 42 may not have a longitudinally-long shape.

The vertical length of the housing 42 is substantially the same as the vertical length of the housing 21 in the main body device 2. The thickness of the housing 42 (or the length in the front-back direction, or the length in the z-axis direction in FIG. 1) is substantially the same as the thickness of the housing 21 in the main body device 2. Therefore, when the left controller 4 is mounted on the main body device 2 (see FIG. 1), the user can grip the left controller 4 as if it is integral with the main body device 2.

The left corners of the main surface of the housing 42 are more rounded than the right corners. That is, the connection part between the top surface and the left side of the housing 42 and the connection part between the lower surface and the left side of the housing 42 are more rounded than the connection part between the upper surface and the right side and the connection part between the lower surface and the right side (in other words, the chamfer R is larger). Therefore, when the left controller 4 is mounted on the main body device 2 (see FIG. 1), the left side of the game system 1 as integrated device is rounded to be a user-friendly shape.

The left controller 4 includes a stick 43. The stick 43 is provided on the main surface of the housing 42. The stick 43 is an exemplary direction input unit capable of inputting a direction. The stick 43 has a stick member capable of being tilted in all directions (at 360° including upward, downward, left, right, and oblique directions) parallel to the main surface of the housing 42. The user can input a direction depending on a tilted direction and a magnitude depending on a tilted angle by tilting the stick member. The direction input unit may be an arrow key, slide stick, or the like.

According to the present embodiment, the stick member can be pressed (in a direction orthogonal to the housing 42). That is, the stick 43 is an input unit capable of being tilted for direction and magnitude depending on a tilted direction and the tilted amount of the stick member, and being pressed for pressing the stick member in its axial direction. The stick may be tilted and pressed at the same time.

The left controller 4 includes four operation buttons 44a to 44d (specifically, right button 44a, down button 44b, left button 44c, and up button 44d). The four operation buttons 44a to 44d are provided below the stick 43 on the main surface of the housing 42. According to the present embodiment, four operation buttons are provided on the main surface of the left controller 4, but any number of operation buttons may be provided. The operation buttons 44a to 44d are used for making instructions depending on various programs (such as OS program or application programs) executed by the main body device 2. The operation buttons 44a to 44d may be used for inputting a direction according to the present embodiment, and thus the operation buttons 44a to 44d are called rightward button 44a, downward button 44b, leftward button 44c, and upward button 44d, respectively. The operation buttons 44a to 44d may be used for making an instruction other than an instruction to input a direction.

The left controller 4 further includes a – (minus) button 45. As illustrated in FIG. 1, the – button 45 is provided on the main surface of the housing 42, more specifically on the upper right region on the main surface. The – button 45 is used for making instructions depending on various programs (such as OS program or application programs) executed by the main body device 2. The – button 45 is used as a select button in a game application (a button used for switching a selected item, for example), for example.

When the left controller 4 is mounted on the main body device 2, the operation units (specifically, the stick 43 and the buttons 44a to 44d) provided on the main surface of the left controller 4 are operated by the left thumb of the user gripping the game system 1 as integrated device, for example. When the left controller 4 is laterally gripped in both hands while being removed from the main body device 2, the operation units are operated by the right and left thumbs of the user gripping the left controller 4, for example. Specifically, in this case, the stick 43 is operated by the left thumb of the user, and the operation buttons 44a to 44d are operated by the right thumb of the user.

The left controller 4 includes a first L button 46. The left controller 4 further includes a ZL button (not illustrated). The first L button 46 and the ZL button are used for making instructions depending on various programs executed by the main body device 2 similarly to the operation buttons 44a to 44d. The first L button 46 is provided at the upper left part of the side of the housing 42. The ZL button is provided at the upper left part between the side and the backside of the housing 42 (strictly, at the upper left part viewed from the top surface of the housing 42). That is, the ZL button is provided behind the first L button 46 (in the positive z-axis direction in FIG. 1). According to the present embodiment, the upper left part of the housing 42 is rounded, and thus the first L button 46 and the ZL button have a rounded shape depending on the rounded upper left part of the housing 42. When the left controller 4 is mounted on the main body device 2, the first L button 46 and the ZL button are arranged at the upper left part of the game system 1 as integrated device.

The left controller 4 includes the slider 41. The slider 41 is provided to vertically extend on the right side of the housing 42. The slider 41 has an engageable shape with the left rail member 24 of the main body device 2 (more specifically, the groove of the left rail member 24). Thus, the slider 41 engaged with the left rail member 24 is fixed in a direction orthogonal to the slide direction (or the direction in which the left rail member 24 extends), and is not to be removed.

A second L button 47 and a second R button 48 (see FIG. 2) are provided on the right side of the left controller 4. The second L button 47 and the second R button 48 are used when one user grips and uses the left controller 4 in both hands in the removed state as described below. When one user grips and uses the left controller 4 in both hands, the left side in FIG. 2 and the right side are on the lower side and the upper side, respectively, for use (see FIG. 8). In this case, the second L button 47 is positioned at the upper left and the second R button 48 is positioned at the upper right.

The left controller 4 includes the terminal 52 (see FIG. 4) for making wired communication with the main body device 2. When the left controller 4 is mounted on the main body device 2, the terminal 52 is provided to contact with the left terminal 26 of the main body device 2. The terminal 52 may be at any specific position. According to the present embodiment, the terminal 52 is provided near the lower end of the surface on which the slider 41 is mounted.

(Right Controller 6)

The right controller 6 includes a housing 62. According to the present embodiment, the housing 62 has a substantially plate shape. The main surface (in other words, the top surface or the surface in the negative z-axis direction in FIG. 1) of the housing 62 substantially has a rectangular shape. According to the present embodiment, the housing 62 has a longitudinally-long shape or a vertically-long shape. The right controller 6 can be gripped in the longitudinally-long direction while being removed from the main body device 2. The housing 62 has a shape and size capable being gripped in one hand, particularly with the left hand when gripped in the longitudinally-long direction. The right controller 6 can be gripped in the laterally-long direction. The right controller 6 may be gripped in both hands when gripped in the laterally-long direction.

The vertical length of the housing 62 in the right controller 6 is substantially the same as the vertical length of the housing 21 in the main body device 2 and the thickness thereof is substantially the same as the thickness of the housing 21 in the main body device 2 similarly to the housing 42 in the left controller 4. Thus, when the right controller 6 is mounted on the main body device 2 (see FIG. 1), the user can grip as if the main body device 2 and the right controller 6 are an integrated device.

The right corners are more rounded than the left corners on the main surface of the housing 62. That is, the connection part between the upper surface and the right side of the housing 62 and the connection part between the lower surface and the right side of the housing 62 are more rounded than the connection part between the upper surface and the left side and the connection part between the lower surface and the left side (in other words, the chamfer R is larger). Thus, when the right controller 6 is mounted on the main body device 2 (see FIG. 1), the right side of the game system 1 as integrated device is rounded to be a user-friendly shape.

The right controller 6 includes a stick 63 as direction input unit similarly to the left controller 4. According to the present embodiment, the stick 63 has the same configuration as the stick 43 of the left controller 4. The right controller 6 includes four operation buttons 64a to 64d (specifically, A button 64a, B button 64b, Y button 64c, and X button 64d) similarly to the left controller 4. According to the present embodiment, the four operation buttons 64a to 64d have the same mechanism as the four operation buttons 44a to 44d of the left controller 4. The stick 63 and the operation buttons 64a to 64d are provided on the main surface of the housing 62. Four operation buttons are provided on the main surface of the right controller 6 according to the present embodiment, but any number of operation buttons may be provided.

According to the present embodiment, the positional relationship between the two kinds of operation units (the stick 63 and the operation buttons 64a to 64d) in the right controller 6 is reverse to the positional relationship between the two kinds of operation units (the stick 43 and the operation buttons 44a to 44d) in the left controller 4. That is, the stick 63 is arranged above the operation buttons 64a to 64d in the right controller 6 while the stick 43 is arranged below the operation buttons 44a to 44d in the left controller 4. The arrangements enable the left controller 4 and the right controller 6 to be used in a similar operation feeling when they are removed from the main body device 2.

The right controller 6 further includes a + (plus) button 65. The + button 65 is provided on the main surface of the housing 62, more specifically at the upper left region on the main surface. The + button 65 is used for making instructions depending on various programs (such as OS program and application programs) executed by the main body device 2 similarly to other operation buttons 64a to 64d. The + button 65 is used as a start button (such as button used to instruct to start a game) in game applications, for example.

The right controller 6 includes a home button 66. As illustrated in FIG. 1, the home button 66 is provided on the main surface of the housing 62, more specifically at the lower left region on the main surface. The home button 66 is directed for displaying a predetermined menu screen on the display 22 of the main body device 2. The menu screen is a screen on which a user-designated application among a plurality of applications executable by the main body device 2 can be activated, for example. The menu screen may be displayed when the main body device 2 is activated, for example. According to the present embodiment, when the home button 66 is pressed while an application is being executed in the main body device 2 (or while an image of the application is being displayed on the display 22), a predetermined operation screen may be displayed on the display 22 (at this time, the menu screen may be displayed instead of the operation screen). The operation screen is a screen on which an instruction to display the menu screen on the display 22 and an instruction to restart an application can be made after the end of the application, for example.

When the right controller 6 is mounted on the main body device 2, the operation units (specifically, the stick 63 and the buttons 64a to 64d) provided on the main surface of the right controller 6 are operated by the right thumb of the user gripping the game system 1, for example. When the right controller 6 is laterally gripped and used in both hands while removed from the main body device 2, the operation units are operated by the right and left thumbs of the user gripping the right controller 6, for example. Specifically, in this case, the stick 63 is operated by the left thumb of the user and the operation buttons 64a to 64d are operated by the right thumbs of the user.

The right controller 6 includes a first R button 67. The right controller 6 further includes a ZR button (not illustrated). The first R button 67 is provided at the upper right of the side of the housing 62. The ZR button is provided at the upper right between the side and the backside of the housing 62 (strictly at the upper right viewed from the top surface of the housing 62). That is, the ZR button is provided behind the first R button 67 (in the positive z-axis direction in FIG. 1). According to the present embodiment, the upper right part of the housing 62 is rounded, and thus the first R button 67 and the ZR button have a rounded shape depending on the rounded upper right part of the housing 62. When the right controller 6 is mounted on the main body device 2, the first R button 67 and the ZR button are arranged at the upper right in the game system 1.

The right controller 6 includes a slider mechanism similarly as in the left controller 4. That is, the right controller 6 includes the slider 61. The slider 61 is provided to vertically extend on the left side of the housing 62. The slider 61 has an engageable shape with the right rail member 25 (more specifically, the groove of the right rail member 25) in the main body device 2. Thus, the slider 61 engaged with the right rail member 25 is fixed in a direction orthogonal to the slide direction (in other words, the direction in which the right rail member 25 extends), and is not to be removed.

A second R button 68 and a second L button 69 (see FIG. 2) are provided on the left side of the right controller 6. The second R button 68 and the second L button 69 are used by one user for gripping and using the right controller 6 in both hands in the removed state as described below. When one user grips and uses the right controller 6 in both hands, the right side in FIG. 2 and the left side are on the lower side and the upper side, respectively, for use (see FIG. 8). In this case, the second R button 68 is positioned at the upper right and the second L button 69 is positioned at the upper left.

The right controller 6 further includes the terminal 72 (see FIG. 4) for making wired communication with the main body device 2. When the right controller 6 is mounted on the main body device 2, the terminal 72 is provided to contact with the right terminal 27 in the main body device 2. The terminal 72 may be at any specific position. According to the present embodiment, the terminal 72 is provided near the lower end of the surface on which the slider 61 is mounted.

Any shapes, numbers, and installation positions of the components (specifically, sliders, sticks, and buttons) may be provided in the housing 42 or 62 in the left controller 4 and the right controller 6. For example, the left controller 4 and the right controller 6 may include a direction input unit of a different type from the stick according to other embodiment. The slider 41 or 61 may be arranged depending on the position of the rail member 24 or 25 provided in the main body device 2, and may be arranged on the main surface or backside of the housing 42 or 62. According to other embodiment, the left controller 4 and the right controller 6 may not include any of the components.

[Internal Configuration of Game System 1]

(Main Body Device 2)

FIG. 3 is a block diagram illustrating an exemplary internal configuration of the main body device 2. Some components in the main body device 2 may be mounted as electronic parts on an electronic circuit board to be housed in the housing 21.

The main body device 2 includes a Central Processing Unit (CPU) 31. The CPU 31 is a control unit for performing various kinds of information processing performed in the main body device 2. The CPU 31 performs various kinds of information processing by executing a game program stored in a storage unit (specifically, an internal storage medium such as flash memory 32, or external storage medium mounted on the slot 28).

The main body device 2 includes the flash memory 32 and Dynamic Random Access Memory (DRAM) 33 as exemplary internal storage mediums incorporated therein. The flash memory 32 and the DRAM 33 are connected to the CPU 31. The flash memory 32 is mainly used for storing various items of data (or programs) stored in the main body device 2. The DRAM 33 is a memory used for temporarily storing various items of data used for the information processing.

The main body device 2 includes a slot interface (denoted as "I/F" below) 34. The slot I/F 34 is connected to the CPU 31. The slot I/F 34 is connected to the slot 28, and reads and writes data from and into a storage medium (such as dedicated memory card) mounted on the slot 28 in response to an instruction of the CPU 31.

The CPU 31 reads and writes data from and into the flash memory 32, the DRAM 33, and each of the above storage mediums as needed, thereby performing the information processing.

The main body device 2 includes a network communication unit 35. The network communication unit 35 is connected to the CPU 31. The network communication unit 35 makes communication (specifically, wireless communication) with an external device via a network. According to the present embodiment, the network communication unit 35 connects to a wireless LAN and makes communication with an external device in a system conforming to the Wi-Fi standard as first communication form. Further, the network communication unit 35 makes wireless communication with other main body device 2 of the same type in a predetermined communication system (such as communication in unique protocol or infrared communication) as second communication form. The wireless communication in the second communication form can be made with other main body device 2 arranged in a closed local network area, and realizes a function of making "local communication" in which a plurality of main body devices 2 directly make communication thereby to exchange data therebetween.

The main body device 2 includes a controller communication unit 36. The controller communication unit 36 is connected to the CPU 31. The controller communication unit 36 makes wireless communication with the left controller 4 and/or the right controller 6. Any communication system between the main body device 2, and the left controller 4 and the right controller 6 may be employed, and the controller communication unit 36 makes communication with the left controller 4 and the right controller 6 in the Bluetooth (trademark) standard according to the present embodiment.

The CPU 31 is connected to the left terminal 26, the right terminal 27, and the lower terminal 30. When making wired communication with the left controller 4, the CPU 31 transmits data to the left controller 4 via the left terminal 26 and receives operation data from the left controller 4 via the left terminal 26. When making wired communication with the right controller 6, the CPU 31 transmits data to the right controller 6 via the right terminal 27 and receives operation data from the right controller 6 via the right terminal 27. When making communication with the cradle 8, the CPU 31 transmits data to the cradle 8 via the lower terminal 30. In this way, according to the present embodiment, the main body device 2 can make both wired communication and wireless communication with the left controller 4 and the right controller 6. When the integrated device in which the left controller 4 and the right controller 6 are mounted on the main body device 2 is mounted on the cradle 8, the main body device 2 can output data (such as image data or sound data) to the stationary monitor 9 via the cradle 8.

Here, the main body device 2 can make communication with a plurality of left controllers 4 at the same time (in other words, in parallel). Further, the main body device 2 can make communication with a plurality of right controllers 6 at the same time (in other words, in parallel). Thus, the user can input in the main body device 2 by use of left controllers 4 and right controllers 6.

The main body device 2 includes a touch panel controller 37 as a circuit for controlling the touch panel 23. The touch panel controller 37 is connected between the touch panel 23 and the CPU 31. The touch panel controller 37 generates data indicating a touched position, for example, on the basis of a signal from the touch panel 23, and outputs it to the CPU 31.

The display 22 is connected to the CPU 31. The CPU 31 displays a generated image (by performing the information processing, for example) and/or an externally-acquired image on the display 22.

The main body device 2 includes a power control unit 38 and a battery 39. The power control unit 38 is connected to the battery 39 and the CPU 31. Though not illustrated, the power control unit 38 is connected to the respective units in the main body device 2 (specifically, the respective units supplied with power from the battery 39, the left terminal 26, and the right terminal 27).

The power control unit 38 controls power supply from the battery 39 to each unit in response to an instruction from the CPU 31. The power control unit 38 is connected to the power supply button 29. The power control unit 38 controls power supply to each unit in response to an entry by the power supply button 29. That is, when the power supply button 29 is turned off, the power control unit 38 stops supplying power to all or some of the units, and when the power supply button 29 is turned on, the power control unit 38 starts supplying power to all or some of the units. The power control unit 38 outputs the information on an entry by the power supply button 29 (specifically information on whether the power supply button 29 is pressed) to the CPU 31.

The battery 39 is connected to the lower terminal 30. When an external charging device (such as the cradle 8) is connected to the lower terminal 30 and the main body device 2 is supplied with power via the lower terminal 30, the supplied power is charged in the battery 39.

The main body device 2 includes a codec circuit 84 and speakers (specifically, left speaker and right speaker) 81. The codec circuit 84 is connected to the speakers 81 and the sound I/O terminal 82, and is connected to the CPU 31. The codec circuit 84 is directed for controlling sound data input in and output from the speakers 81 and the sound I/O terminal 82. That is, when receiving sound data from the CPU 31, the codec circuit 84 D/A-converts the sound data and outputs a resultant sound signal to the speakers 81 or the sound I/O terminal 82. Thereby, the sound is output from the speakers 81 or the sound output unit (such as earphone) connected to the sound I/O terminal 82. When receiving a sound signal from the sound I/O terminal 82, the codec circuit 84 A/D-converts the sound signal and outputs sound data in a predetermined format to the CPU 31. The sound volume button 83 is connected to the CPU 41. The CPU 31 controls the sound volume output from the speakers 81 or the sound output unit on the basis of the entry by the sound volume button 83.

(Left Controller 4)

As illustrated in FIG. 4, the left controller 4 includes a communication control unit 50 for controlling communication with the main body device 2. The communication control unit 50 is connected to the respective components including the terminal 52 and a main body communication unit 53. According to the present embodiment, the communication control unit 50 can make both wired communication via the terminal 52 and wireless communication not via the terminal 52 but via the main body communication unit 53 with the main body device 2.

The main body communication unit 53 is connected to the communication control unit 50. The main body communication unit 53 makes wireless communication with the main body device 2. Any communication system between the main body device 2 and the left controller 4 may be employed, and according to the present embodiment, the main body communication unit 53 makes communication with the main body device 2 in the Bluetooth (trademark) standard as described above.

The communication control unit 50 controls a communication method performed by the left controller 4 for the main body device 2. That is, when the left controller 4 is mounted on the main body device 2, the communication control unit 50 makes wired communication with the main body device 2 via the terminal 52. When the left controller 4 is removed from the main body device 2, the communication control unit 50 makes wireless communication with the main body device 2 (specifically, the controller communication unit 36) via the main body communication unit 53.

The left controller 4 includes a memory 51 such as flash memory. The communication control unit 50 is configured of a microcomputer (or microprocessor), for example, and performs various kinds of processing by executing firmware stored in the memory 51.

The left controller 4 includes the buttons 44a to 44d, and 45 to 48. The left controller 4 further includes the stick 43. Each of the buttons 44a to 44d, and 45 to 48, and the stick 43 repeatedly outputs the information on an operation performed for it as operation data to the communication control unit 50 as needed.

The communication control unit 50 acquires the information on an entry (specifically, information on operation, or detection result by the detection units) from each input unit (specifically, each of the buttons 44a to 44d and 45 to 48, and the stick 43). The communication control unit 50 transmits the operation data including the acquired information (or predetermined processed information of the acquired information) to the main body device 2. The operation data is repeatedly transmitted per predetermined time. An interval at which the information on an entry is transmitted to the main body device 2 may be or may not be the same among the input units.

The operation data is transmitted to the main body device 2, and thus the main body device 2 can acquire the entry by the left controller 4. That is, the main body device 2 can determine the operations on the buttons 44a to 44d and 45 to 48 and the stick 43 on the basis of the operation data.

The left controller 4 includes a power supplying unit 54. According to the present embodiment, the power supplying unit 54 has a battery and a power control circuit. Though not illustrated, the power control circuit is connected to the battery, and to each unit of the left controller 4 (specifically, each unit supplied with power from the battery). The power control circuit controls power supply from the battery to each unit. The battery is connected to the terminal 52. According to the present embodiment, when the left controller 4 is mounted on the main body device 2, the battery is charged by the power supplied from the main body device 2 via the terminal 52 under a predetermined condition.

(Right Controller 6)

The right controller 6 includes a communication control unit 70 for controlling communication with the main body device 2. The right controller 6 further includes a memory 71 connected to the communication control unit 70. The communication control unit 70 is connected to the components including the terminal 72 and a main body communication unit 73. The main body communication unit 73 is connected to the communication control unit 70. The main body communication unit 73 makes wireless communication with the main body device 2. Any communication system between the main body device 2 and the right controller 6 can be employed, and according to the present embodiment, the main body communication unit 73 makes communication with the main body device 2 in the Bluetooth (trademark) standard as described above.

The communication control unit 70, the memory 71, the terminal 72, and the main body communication unit 73 have the similar functions to the communication control unit 50, the memory 51, the terminal 52, and the main body communication unit 53 in the left controller 4. Thus, the communication control unit 70 can make communication with the main body device 2 in both wired communication via the terminal 72 and wireless communication not via the terminal 72 but via the main body communication unit 73, and controls a communication method performed by the right controller 6 for the main body device 2.

The right controller 6 includes the similar input units (specifically, the buttons 64a to 64d and 65 to 69, and the stick 63) to the input units in the left controller 4. The input units have the similar functions to the input units in the left controller 4, and similarly operate. The stick 63 includes the tilt detection unit 631 for detecting a direction and magnitude of tilt of the stick 63, and a press detection unit 632 similarly to the stick 43 (see FIG. 5). The tilt detection unit 631 outputs the operation information on a direction and magnitude of tilt of the stick 63 as information on an entry by the stick 63 to the communication control unit 70. The press detection unit 632 outputs the operation information on the presence of press of the stick 63 as information on an entry by the stick 63 to the communication control unit 70.

The right controller 6 includes a power supplying unit 74. The power supplying unit 74 has the similar function to the power supplying unit 54 in the left controller 4, and similarly operates. That is, the power supplying unit 74 controls power supply to each unit supplied with power from the battery. When the right controller 6 is mounted on the main body device 2, the battery is charged by the power supplied from the main body device 2 via the terminal 72 under a predetermined condition.

[Game Processing]

The game program and various items of data (including image data and sound data) according to the present embodiment are stored in the flash memory 32. When performing the game processing, the CPU 31 reads the game program and the data from the flash memory 32 into the DRAM 33, executes the game program, and uses various items of data at this time. When the game program and various items of data are stored in a storage medium inserted in the slot 28, the CPU 31 may read the game program and various items of data from the storage medium into the DRAM 33 thereby to execute the game program.

Figure 5:
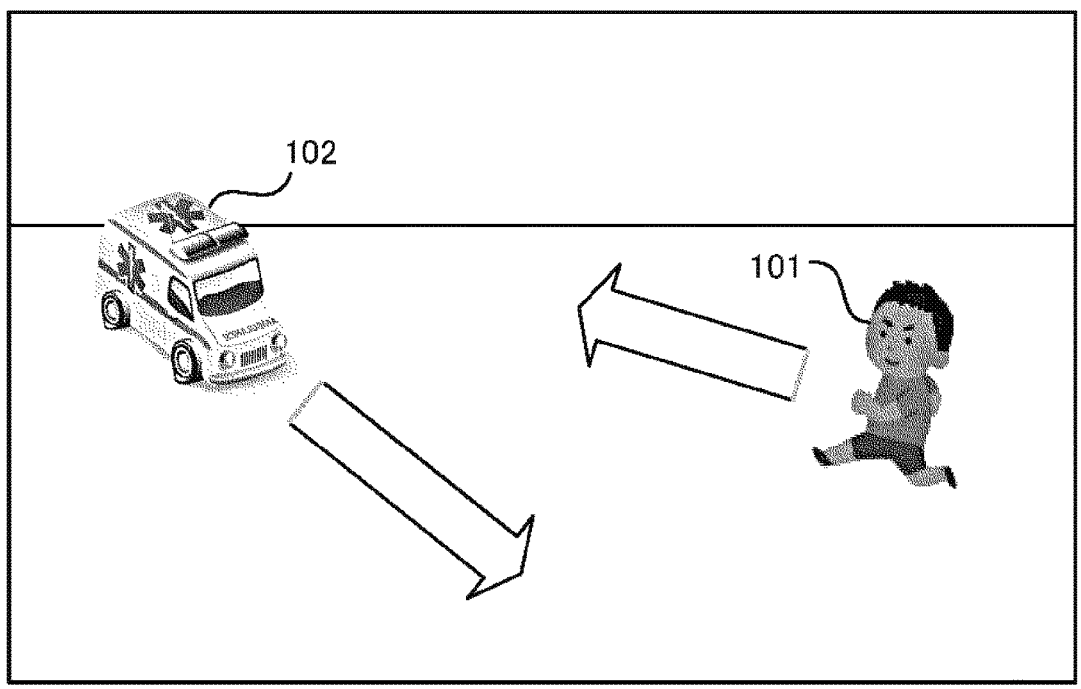
FIG. 5 is a diagram illustrating an exemplary game screen according to the embodiment.

A plurality of objects including a player object and a non-player object are set in a virtual space in the game executed by the game program according to the present embodiment. The CPU 31 generates an image (game screen) of the virtual space including the objects according to the game program, and outputs it to the display 22. FIG. 5 is a diagram illustrating an exemplary game screen. A player object 101 and a non-player object 102 are displayed on the game screen in the example of FIG. 5. The data used in the game program includes drawing data for drawing the virtual space and the respective objects, and various items of sound data.

A user plays the game while watching the game screen displayed on the display 22. For example, when the user operates an operation member (such as the stick 43 in the left controller 4) assigned to movement of the player character in the controller 4 and the controller 6, the operation data is sent to the main body device 2 so that the CPU 31 moves the player object in the virtual space in response to the operation data and accordingly generates and outputs a game image to the display 22.

The non-player objects include a sound-producing object. The non-player object 102 is associated with predetermined sound data, and when the player object 101 approaches the sound-producing non-player object 102 in the virtual space, the CPU 31 outputs the sound data associated with the non-player object 102 to the codec circuit 84, and the codec circuit 84 receiving the sound data from the CPU 31 outputs a sound signal obtained by D/A-converting the sound data to the speakers 81 or the sound I/O terminal 82.

The CPU 31 adjusts the sound volume of the sound data and outputs the adjusted sound volume to the codec circuit 84 such that the sound is output at the sound volume depending on a distance between the non-player object 102 as virtual sound source virtually producing sound in the virtual space and the player object 101 set with a virtual microphone for virtually capturing the sound produced from the non-player object in the virtual space. As described below, the CPU 31 adjusts the frequency of the sound data depending on the speed vectors of the non-player object 102 and the player object 101. When the sound processing is performed in this way, the CPU 31 and the main body device 2 can function as a sound processing device, and the game program for the function can be a sound processing program.

Typically, a position of the virtual sound source does not need to completely match with a position of the non-player object 102, and may be associated with the non-player object 102 or may be slightly offset from the non-player object 102, for example. A position of the virtual microphone for virtually capturing sound does not need to completely match with a position of the player object 101, and may be associated with the non-player object 102 or may be slightly offset from the player object 101, for example. According to the present embodiment, the position of the non-player object 102 matches with the position of the virtual sound source, and thus the non-player object 102 will be denoted as virtual sound source 102 below, and the position of the player object 101 matches with the position of the virtual microphone, and thus the player object 101 will be denoted as virtual microphone 101 below.

The player object 101 moves in any direction in the virtual space in response to a user operation, and the sound-producing non-player object 102 also moves in any direction in the virtual space according to the game program. The user can adjust the speed of movement of the player object 101. The sound-producing non-player object 102 also moves at a different speed depending on its kind or situation of the game. In this way, when a speed is caused in the virtual sound source 102 and/or the virtual microphone 101, the Doppler effect is caused on the sound from the virtual sound source 102, which is virtually captured by the virtual microphone 101.

The present embodiment is such that the sound data associated with the non-player object 102 is not just output but the sound data is adjusted in frequency on the basis of the Doppler effect thereby to generate and output modified sound via the speakers 81. Specific processing for frequency adjustment will be described below.

(First Exemplary Processing: Virtual Microphone Stops)

Figure 6:
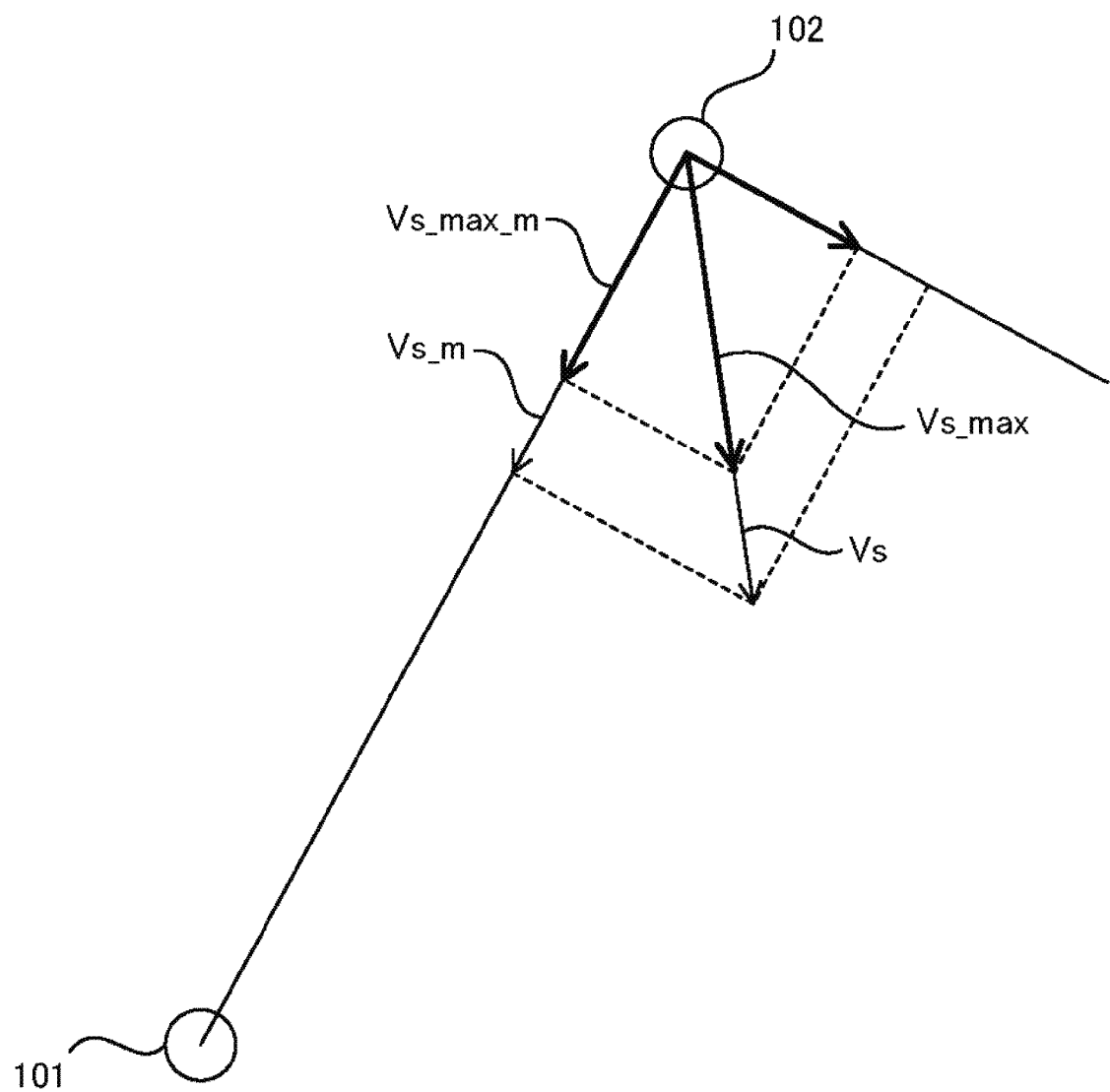
FIG. 6 is a diagram illustrating a relationship between positional relationship between a virtual sound source and a virtual microphone in a virtual space, and speed according to the embodiment.

FIG. 6 is a diagram illustrating a positional relationship and a relationship of speed between the non-player object 102 as virtual sound source for producing sound and the player object 101 set with the virtual microphone for virtually capturing sound produced by the non-player object. Typically, a position of the virtual sound source does not need to completely match with a position of the non-player object 102, and may be associated with the non-player object 102 or may be slightly offset from the non-player object 102, for example. A position of the virtual microphone for virtually capturing sound does not need to completely match with a position of the player object 101, and may be associated with the non-player object 102 or may be slightly offset from the player object 101, for example. According to the present embodiment, the position of the non-player object 102 matches with the position of the virtual sound source, and thus the non-player object 102 will be denoted as virtual sound source 102 below, and the position of the player object 101 matches with the position of the virtual microphone, and thus the player object 101 will be denoted as virtual microphone 101 below.

The example of FIG. 6 assumes that the virtual microphone 101 is still and the virtual sound source 102 moves at a speed vector Vs (which will be simply denoted as "speed Vs" below). The virtual microphone 101 is still in the example of FIG. 6, and thus the speed Vs is a relative speed (vector) of the virtual sound source 102 relative to the virtual microphone 101. When a component in a direction toward the virtual microphone 101 (or away from the virtual microphone 101) (which will be denoted as "microphone direction component" below) in the speed Vs of the virtual sound source 102 is assumed as Vs_m, the microphone direction component Vs_m contributes to the Doppler effect. That is, in consideration of the Doppler effect and assuming a sound speed C and a sound frequency f0, a frequency f of the sound observed by the virtual microphone 101 is expressed in the following Equation (1).

$$f = \frac{C}{C - V_{s\_m}} f_0 \qquad (1)$$

The virtual sound source 102 moves at the speed Vs and thus the microphone direction component Vs_m changes according to the trigonometric function so that the frequency of the sound virtually captured by the virtual microphone 101 changes and the Doppler effect can be perceived. However, if the speed Vs is too high, the speed exceeds a change in frequency which the human can actually feel, and the Doppler effect is difficult to perceive.

Thus, according to the present embodiment, when an upper limit Vs_max is set for the speed Vs and the speed Vs exceeds the upper limit Vs_max, the CPU 31 clamps (fixes) the speed Vs at the upper limit Vs_max, and uses a microphone direction component Vs_max_m in the upper limit Vs_max for calculating the Doppler effect. By doing so, even if a relative speed between the virtual microphone 101 and the virtual sound source 102 in the virtual space is incredibly high, the user can perceive the Doppler effect.

Figure 7:
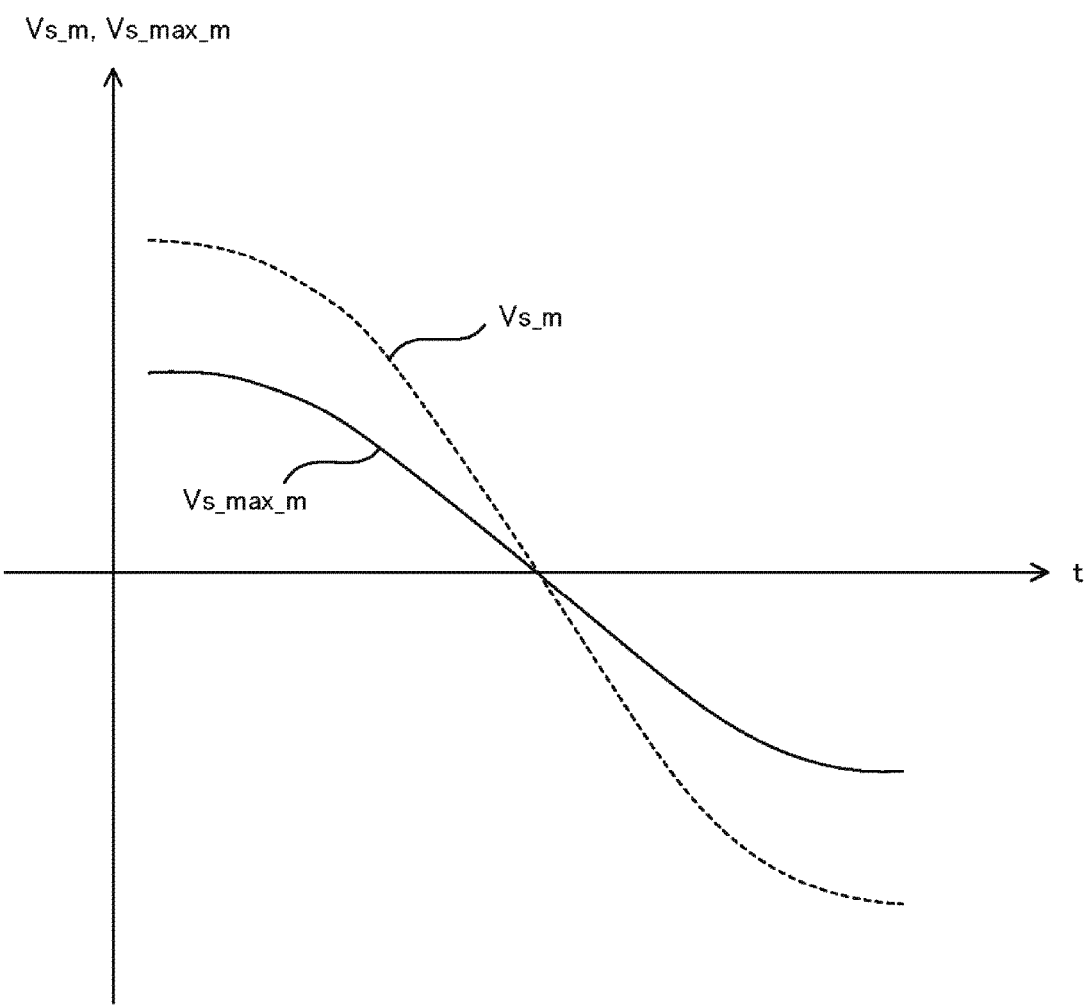
FIG. 7 is a graph illustrating a temporal change in virtual microphone direction component at a speed of the virtual sound source according to the embodiment.

FIG. 7 is a graph indicating a temporal change in microphone direction component in the speed of the virtual sound source. As illustrated in FIG. 7, a drop in the speed component Vs_m of the speed Vs is relatively large and a change is steep, while a drop in the speed component Vs_max_m is relatively small and a change is gentle.

Figure 8:
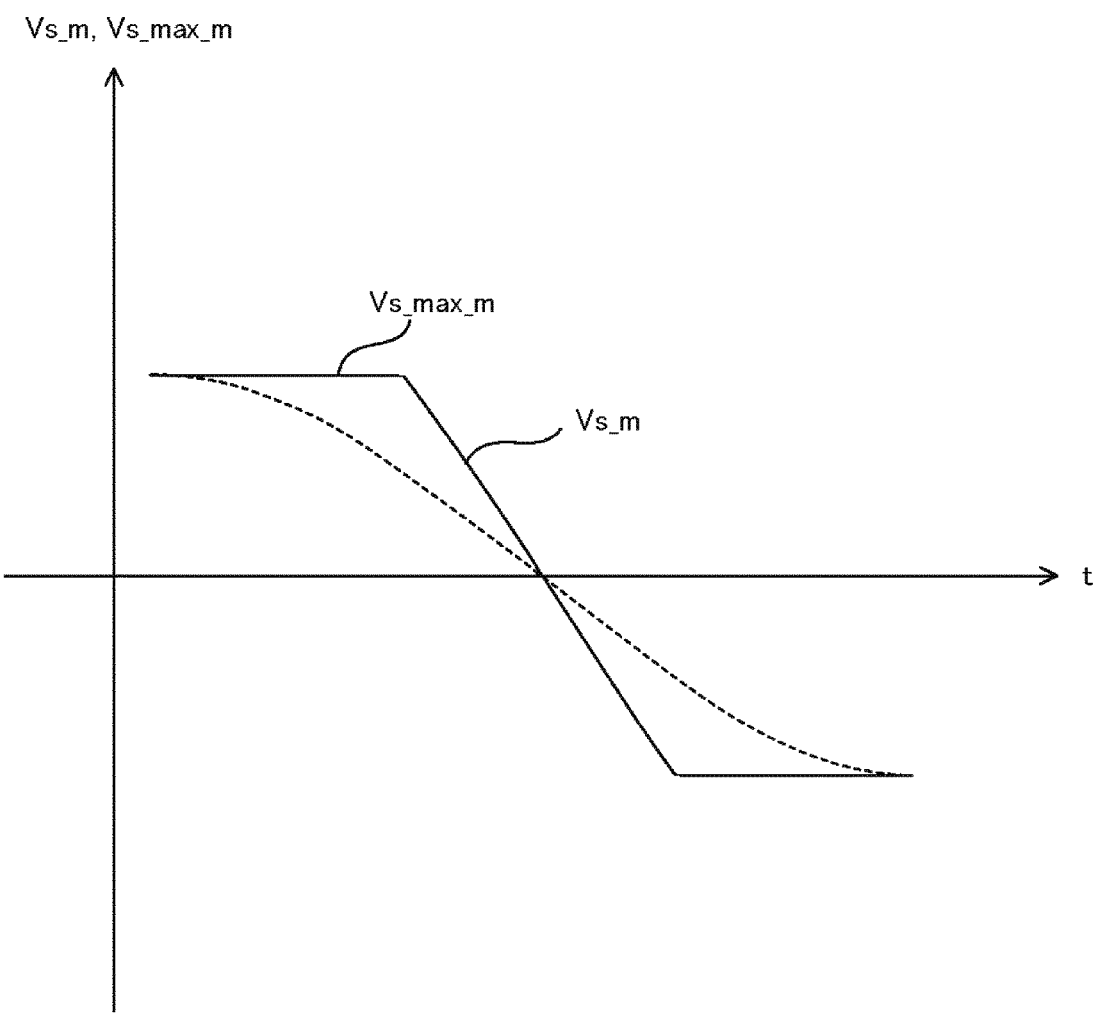
FIG. 8 is a graph illustrating a temporal change in microphone direction component at a speed of the virtual sound source.

It is assumed that an upper limit is set for the microphone direction speed component Vs_m in the speed Vs and the speed component Vs_m exceeds the upper limit, the speed component Vs_m is clamped at the upper limit. FIG. 8 is a graph illustrating a temporal change in microphone direction component in the speed of the virtual sound source. When the virtual sound source 102 moves at a constant speed, even if the speed Vs is clamped at the upper limit Vs_max, the magnitude of the speed component Vs_max_m toward the virtual microphone 101 (or away from the virtual microphone 101) changes along with the movement and the Doppler effect is effectively obtained as illustrated in FIG. 7, but when the microphone direction speed component Vs_m is clamped at the upper limit Vs_max_m as illustrated in FIG. 8, the microphone direction speed component does not change from the upper limit Vs_max_m until the virtual microphone 101 and the virtual sound source 102 sufficiently approach each other, and even when the virtual microphone 101 and the virtual sound source 102 sufficiently approach each other and the speed component starts changing, the change is steep and the Doppler effect cannot be effectively obtained. To the contrary, according to the present embodiment, the speed Vs of the virtual sound source 102 is clamped at the upper limit, even if the speed of the virtual sound source 102 is fixed, the microphone direction speed component Vs_max_m changes along with the movement as indicated in a dotted line in FIG. 8, and thus the frequency virtually observed by the virtual microphone 101 changes and the Doppler effect can be perceived.

As described above, according to the present embodiment, when the virtual sound source 102 approaches the virtual microphone 101 at a constant speed and passes by the virtual microphone 101, even if the virtual sound source 102 moves at a high speed, the frequency virtually observed by the virtual microphone 101 smoothly changes and the Doppler effect can be easily perceived.

When the frequency is calculated in Equation (1), the microphone direction component Vs_m in the speed of the virtual sound source 102 may be multiplied by a predetermined coefficient per acoustic effect (such as per type of the non-player object associated with the sound data or per type of the speed data). C in Equation (1) does not necessarily take the sound speed (340 m/second).

(Second Exemplary Processing: Both Virtual Microphone and Virtual Sound Source Move—Relative Speed)

Figure 9:
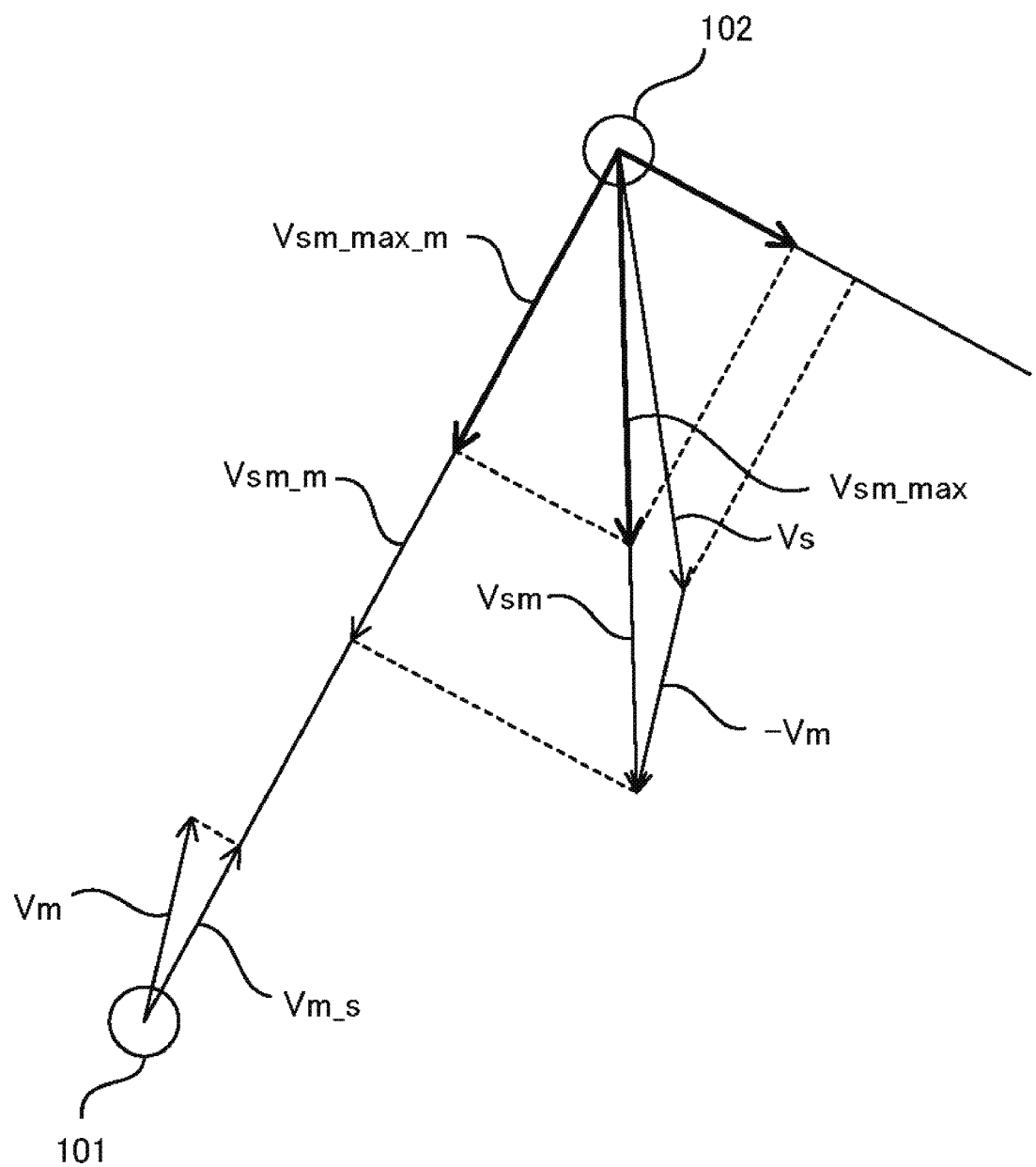
FIG. 9 is a diagram illustrating a relationship between positional relationship between the virtual sound source and the virtual microphone in the virtual space, and speed according to the embodiment.

FIG. 9 is a diagram illustrating a positional relationship and a relationship of speed between the virtual sound source 102 and the virtual microphone 101 in the virtual space. The virtual microphone 101 moves at a speed Vm in the example of FIG. 9, and thus the Doppler effect is expressed in the following Equation (2) assuming the virtual sound source direction component Vm_s.

$$f = \frac{C - V_{m\_s}}{C - V_{s\_m}} f_0 \quad (2)$$

In the example, however, a relative speed Vsm (=Vs −Vm) of the virtual sound source 102 relative to the virtual microphone 101 is found and the Doppler effect is calculated on the basis of the relative speed Vsm. Also in this case, an upper limit Vsm_max is set for the relative speed Vsm and the relative speed Vsm exceeds the upper limit Vsm_max, the relative speed Vsm is claimed at the upper limit Vsm_max. The frequency by the virtual microphone 101 is then calculated in the following Equation (3) by use of a microphone direction component Vsm_max_m in Vsm_max.

$$f = \frac{C}{C - V_{s\_max\_m}} f_0 \quad (3)$$

Thereby, a steep change in frequency is avoided and a change in frequency due to the Doppler effect is easily perceived.

Also in this case, a microphone direction component Vsm_m in the relative speed Vsm is not clamped at the upper limit, and the relative speed Vsm is claimed and then the microphone direction component Vsm_max_m is found thereby to calculate the frequency. By doing so, a smooth change in frequency is realized.

(Third Exemplary Processing: Both Virtual Microphone and Virtual Sound Source Move—Both Speeds are Clamped)

Figure 10:
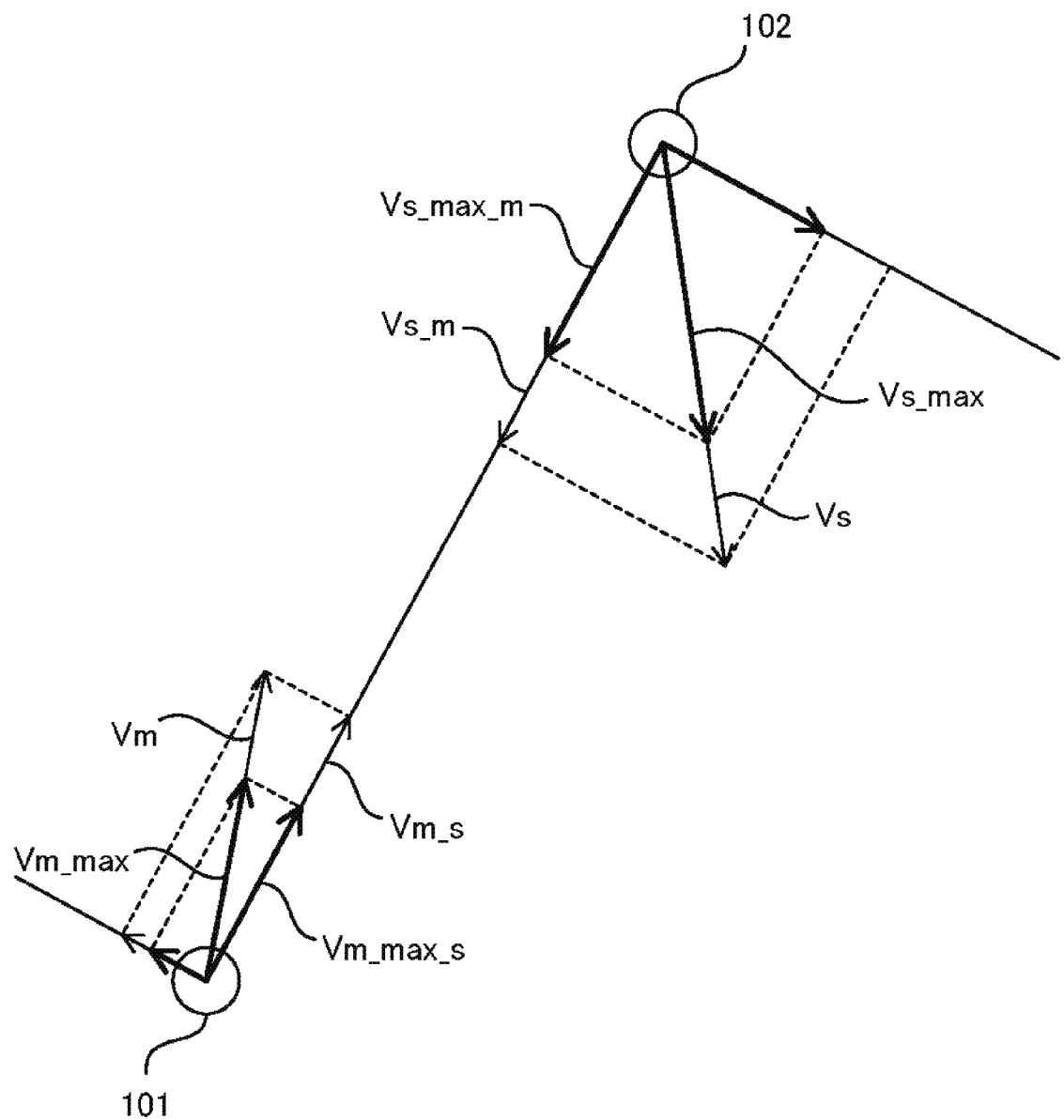
FIG. 10 is a diagram illustrating a relationship between positional relationship between the virtual sound source and the virtual microphone in the virtual space, and speed according to the embodiment.

FIG. 10 is a diagram illustrating a positional relationship and a relationship of speed between the virtual sound source 102 and the virtual microphone 101 in the virtual space. As described above, when both the virtual microphone 101 and the virtual sound source 102 move, the Doppler effect is calculated in Equation (2). In the present exemplary processing, when the upper limit Vs_max is set for the speed Vs of the virtual sound source 102 and the speed Vs exceeds the upper limit Vs_max, the speed Vs is claimed at the upper limit Vs_max, and when the upper limit Vm_max is set for the speed Vm of the virtual microphone 101 and the speed Vm exceeds the upper limit Vm_max, the speed Vm is clamped at the upper limit Vm_max.

When both the speed Vs of the virtual sound source 102 and the speed Vm of the virtual microphone 101 exceed the upper limits, respectively, the frequency is calculated in the following Equation (4) by use of the upper limits.

$$f = \frac{C - V_{m\_max\_s}}{C - V_{s\_max\_m}} f_0 \quad (4)$$

Also in the exemplary processing, even if the speed of the virtual microphone 101 and/or the virtual sound source 102 is high, a steep change in frequency can be restricted and a smooth change in frequency can be realized. When the speed Vs of the virtual sound source 102 does not exceed the upper limit Vs_max, the speed Vs is used as it is, and when the speed Vm of the virtual microphone 101 does not exceed the upper limit Vm_max, the speed Vm is used as it is thereby to calculate the frequency.

(Fourth Exemplary Processing: Both Virtual Microphone and Virtual Sound Source Move—Speed of Virtual Sound Source is Clamped)

Figure 11:
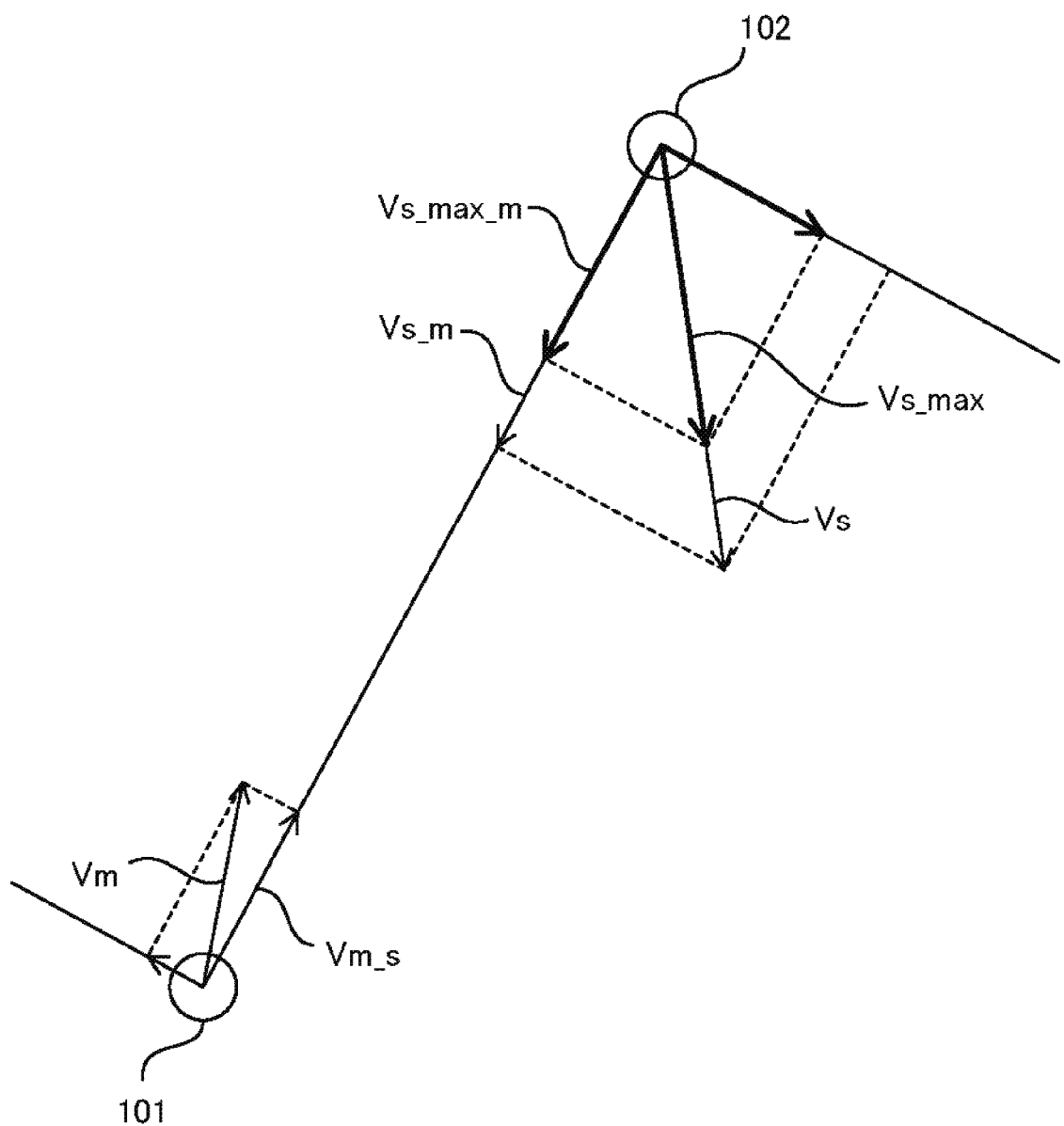
FIG. 11 is a diagram illustrating a relationship between positional relationship between the virtual sound source and the virtual microphone in the virtual space, and speed according to the embodiment.

FIG. 11 is a diagram illustrating a positional relationship and relationship of speed between the virtual sound source 102 and the virtual microphone 101 in the virtual space. In the present exemplary processing, when the upper limit Vs maxis set for the speed Vs of the virtual sound source 102 and the speed Vs exceeds the upper limit Vs_max, the speed Vs is clamped at the upper limit Vs_max. The speed Vm of the virtual microphone 101 is used as it is.

By doing so, when the speed Vs of the virtual sound source 102 exceeds the upper limit Vs_max, the frequency is calculated in the following Equation (5) by use of the upper limit Vs_max.

$$f = \frac{C - V_{m\_s}}{C - V_{s\_m\_max}} f_0 \quad (5)$$

Also in the present exemplary processing, even when the speed Vs of the virtual sound source 102 is high, a steep change in frequency can be restricted and a smooth change in frequency can be realized. When the speed Vs of the virtual sound source 102 does not exceed the upper limit Vs_max, the speed Vs is used as it is thereby to calculate the frequency.

(Fifth Exemplary Processing: Both Virtual Microphone and Virtual Sound Source Move—Speed of Virtual Microphone is Clamped)

Figure 12:
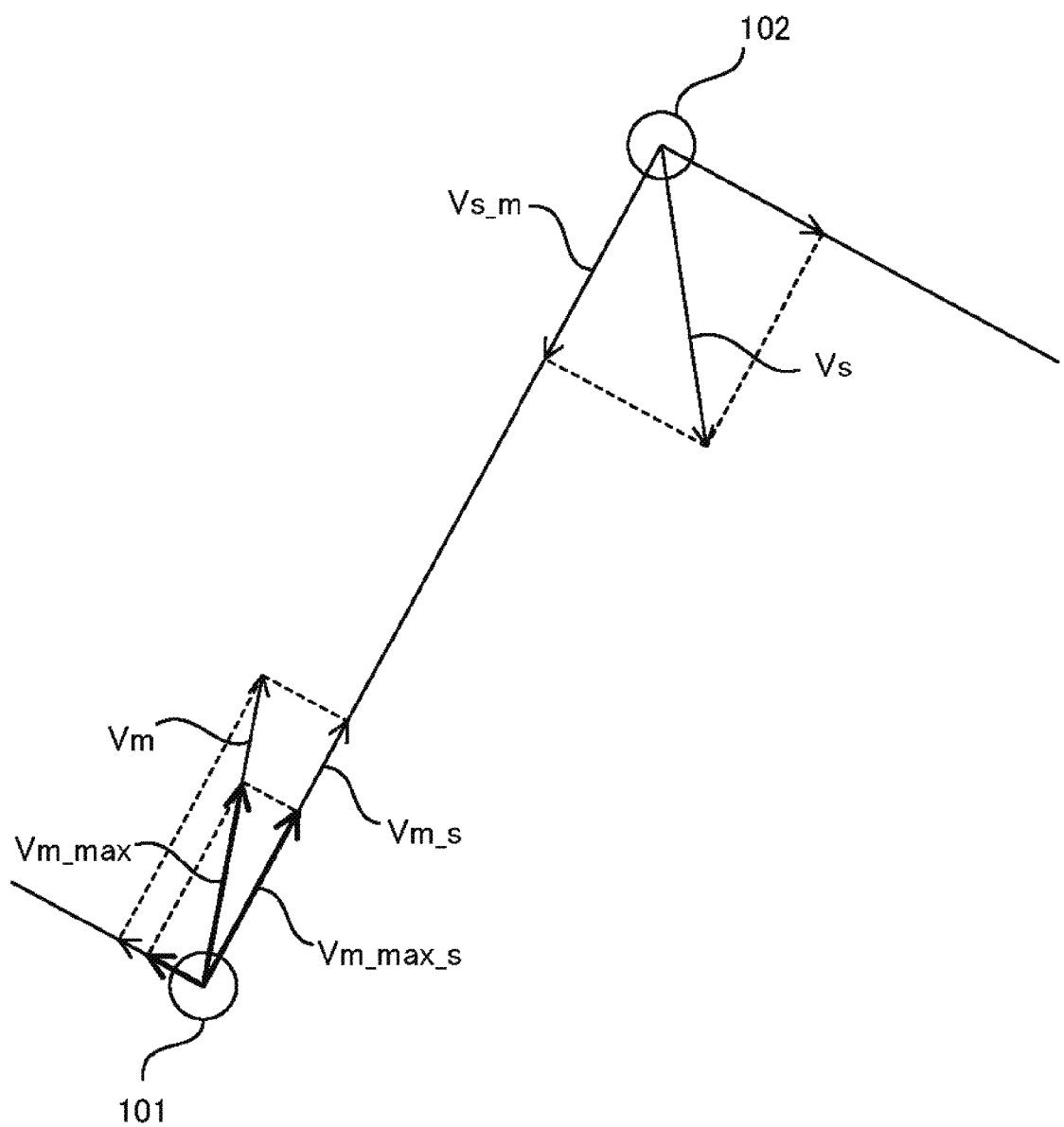
FIG. 12 is a diagram illustrating a relationship between positional relationship between the virtual sound source and the virtual microphone in the virtual space, and speed according to the embodiment.

FIG. 12 is a diagram illustrating a positional relationship and a relationship of speed between the virtual sound source 102 and the virtual microphone 101 in the virtual space. In the present exemplary processing, when the upper limit Vm_max is set for the speed Vm of the virtual microphone 101 and the speed Vm exceeds the upper limit Vm_max, the speed Vm is clamped at the upper limit Vm_max. The speed Vs of the virtual sound source is used as it is.

By doing so, when the speed Vm of the virtual microphone 101 exceeds the upper limit Vm_max, the sound source direction component Vm_max_m is found by use of the upper limit Vm_max thereby to calculate the frequency in the following Equation (6).

$$f = \frac{C - V_{m\_max\_s}}{C - V_{s\_m}} f_0 \quad (6)$$

Also in the present exemplary processing, even when the speed Vm of the virtual microphone 101 is high, a steep change in frequency can be restricted and a smooth change in frequency can be realized. When the speed Vm of the virtual microphone 101 does not exceed the upper limit Vm_max, the speed Vm is used as it is thereby to calculate the frequency.

When the frequency f reflecting the Doppler effect is calculated in any exemplary processing described above, the CPU 31 performs frequency conversion on the sound produced by the virtual sound source 102 (the sound data associated with the non-player object 102) such that the frequency of the sound is to be the calculated frequency f.

As described above, according to the present embodiment, when the virtual sound source 102 and the virtual microphone 101 approach each other in the virtual space, the CPU 31 outputs the sound to be produced from the virtual sound source 102, but when a speed is caused in the virtual sound source 102 and/or the virtual microphone 101, the frequency of the set sound is adjusted and output according to the Doppler effect depending on the speed. At this time, when the speed of the virtual sound source 102 and/or the virtual microphone 101 is high (and when a relative speed between the virtual sound source 102 and the virtual microphone 101 is high if the speeds of the virtual sound source 102 and the virtual microphone 101 are high), the CPU 31 clamps the speed of the virtual sound source 102 and/or the virtual microphone 101 at a predetermined upper limit, and then calculates a change in frequency in the virtual microphone 101 due to the Doppler effect. Thus, the high speed is used as it is thereby to restrict a steep change in frequency, and the user can suitably perceive the change in frequency (the operation of the Doppler effect).

In order to limit the speed as described above, according to the present embodiment, the speed components contributing to the Doppler effect, or the sound source direction component in the speed of the virtual microphone 101 and the microphone direction component in the speed of the virtual sound source 102 are not clamped at the upper limits, respectively, but the speed of the virtual microphone 101 and/or the speed of the virtual sound source 102 is clamped at the upper limit and the sound source direction component and/or the microphone direction component in the thus-limited speed is found thereby to calculate the frequency due to the Doppler effect. Therefore, the frequency smoothly changes also when the speeds are limited, and the user can easily perceive the Doppler effect also in this regard.

The virtual microphone is associated with the player object and the virtual sound source is associated with the non-player object according to the above embodiment, but the present invention is not limited thereto, and the virtual sound source may be associated with the player object, for example (that is, the position or speed of the virtual sound source may be user-controllable).

The virtual microphone 101 is associated with the player object, the virtual sound source 102 is associated with the non-player object, and the Doppler effect is calculated as acoustic effect according to the above embodiment, but the present invention can be similarly applied to calculate an effect depending on a relative speed when the player object and/or the non-player object has a mutual relative speed. For example, a wind pressure, which is to be felt by the player object when the player object and the non-player object pass each other at a high speed in the virtual space, is due to a relative speed between the player object and the non-player object, and the present invention can be applied to calculate a virtual wind pressure as an effect of the relative speed.

That is, there may be configured such that the CPU 31 acquires data for outputting information, moves an output source and/or a virtual observation point in a virtual space in which the output source for outputting the information and the virtual observation point for virtually observing the information virtually output from the output source are set, generates modified information by adding an effect using the limited values virtually observed at the virtual observation point when the information is output from the output source to the information by use of the values of the limited speeds of the output source and/or the virtual observation point, and outputs the modified information.

I claim:

1. A non-transitory storage medium having stored therein a game program which, when executed by a computer, causes the computer to perform operations comprising:
acquiring sound data;
setting, in a virtual space, a virtual sound source configured to virtually produce sound based on the sound data and a virtual microphone configured to virtually capture the sound virtually produced by the virtual sound source;
determining the Doppler effect for the sound produced by the virtual sound source and virtually captured by the virtual microphone based on a first speed of movement in the virtual space of the virtual sound source and/or on a second speed of movement in the virtual space of the virtual microphone, wherein, in the determining of the Doppler effect, the first speed is clamped to a first maximum speed when the first speed of movement in the virtual space of the virtual sound source exceeds the first maximum speed and/or the second speed is clamped to second maximum speed when the second speed of movement in the virtual space of the virtual microphone exceeds the second maximum speed;
modifying the sound virtually captured by the virtual microphone according to the determined Doppler effect; and
outputting the modified sound.

2. The non-transitory storage medium according to claim 1,
wherein a position of the virtual sound source in the virtual space is associated with a position of a first object in the virtual space, and a position of the virtual microphone in the virtual space is associated with a position of a second object in the virtual space.

3. The non-transitory storage medium according to claim 2, wherein the second object comprises a player object moving in the virtual space in response to a user operation.

4. A sound processing method comprising:
acquiring sound data;
setting, in a virtual space, a virtual sound source configured to virtually produce sound based on the sound data and a virtual microphone configured to virtually capture the sound virtually produced by the virtual sound source;
determining the Doppler effect for the sound produced by the virtual sound source and virtually captured by the virtual microphone based on a first speed of movement in the virtual space of the virtual sound source and/or on a second speed of movement in the virtual space of the virtual microphone, wherein, in the determining of the Doppler effect, the first speed is clamped to a first maximum speed when the first speed of movement in the virtual space of the virtual sound source exceeds the first maximum speed and/or the second speed is clamped to second maximum speed when the second speed of movement in the virtual space of the virtual microphone exceeds the second maximum speed;
modifying the sound virtually captured by the virtual microphone according to the determined Doppler effect; and
outputting the modified sound.

5. A sound processing device comprising:
a controller for receiving a user operation;
storage configured to store therein sound data; and
a processor configured to at least:
set, in a virtual space, a virtual sound source configured to virtually produce sound based on the sound data and a virtual microphone configured to virtually capture the sound virtually produced by the virtual sound source; determine the Doppler effect for the sound produced by the virtual sound source and virtually captured by the virtual microphone based on a first speed of movement in the virtual space of the virtual sound source and/or on a second speed of movement in the virtual space of the virtual microphone, wherein, in the determining of the Doppler effect, the first speed is clamped to a first maximum speed when the first speed of movement in the virtual space of the virtual sound source exceeds the first maximum speed and/or the second speed is clamped to second maximum speed when the second speed of movement in the virtual space of the virtual microphone exceeds the second maximum speed; and
modify the sound virtually captured by the virtual microphone according to the determined Doppler effect; and
a speaker configured to output the modified sound.

6. A non-transitory storage medium having stored therein a game program which, when executed by a computer connected to a controller for receiving a user operation, storage for storing therein sound data, and a speaker, causes the computer to perform operations comprising:
setting at least a first object and a second object in a virtual space;
receiving, from the controller, an instruction to move the second object in the virtual space;
reading, from the storage, sound data associated with the first object within a predetermined distance from the second object in the virtual space;
acquiring sound data for producing sound by the first object;
moving the second object in response to the instruction to move;
determining the Doppler effect for the sound produced by the first object and virtually captured by the second object based on a first speed of movement in the virtual space of the first object and/or on a second speed of movement in the virtual space of the second object, wherein, in the determining of the Doppler effect, the first speed is clamped to a first maximum speed when the first speed of movement in the virtual space of the virtual sound source exceeds the first maximum speed and/or the second speed is clamped to second maximum speed when the second speed of movement in the virtual space of the virtual microphone exceeds the second maximum speed;
modifying the sound virtually captured by the second object according to the determined Doppler effect; and
outputting the modified sound from the speaker.

* * * * *